United States Patent
Izawa

(10) Patent No.: US 7,868,915 B2
(45) Date of Patent: Jan. 11, 2011

(54) PHOTOGRAPHING APPARATUS, METHOD AND COMPUTER PROGRAM PRODUCT

(75) Inventor: Katsutoshi Izawa, Asaka (JP)

(73) Assignee: Fujifilm Corporation, Tokyo (JP)

( * ) Notice: Subject to any disclaimer, the term of this patent is extended or adjusted under 35 U.S.C. 154(b) by 387 days.

(21) Appl. No.: 12/027,848

(22) Filed: Feb. 7, 2008

(65) Prior Publication Data
US 2008/0192122 A1 Aug. 14, 2008

(30) Foreign Application Priority Data
Feb. 9, 2007 (JP) ............................. 2007-030074

(51) Int. Cl.
H04N 5/225 (2006.01)
G06K 9/00 (2006.01)
(52) U.S. Cl. ...................... 348/169; 382/103; 382/118
(58) Field of Classification Search ......... 348/345–354, 348/362–366, 333.01–333.03, 169, 152, 348/207.99; 382/103, 115–118, 165, 190, 382/209
See application file for complete search history.

(56) References Cited

U.S. PATENT DOCUMENTS

| | | | |
|---|---|---|---|
| 2001/0031072 A1* | 10/2001 | Dobashi et al. ............. | 382/118 |
| 2005/0069208 A1 | 3/2005 | Morisada | |
| 2006/0012702 A1* | 1/2006 | Kawahara et al. ........... | 348/345 |
| 2006/0029265 A1* | 2/2006 | Kim et al. ................... | 382/118 |
| 2006/0115157 A1* | 6/2006 | Mori et al. .................. | 382/190 |
| 2007/0110422 A1* | 5/2007 | Minato et al. ................ | 396/89 |

FOREIGN PATENT DOCUMENTS

| | | | |
|---|---|---|---|
| JP | 7311833 A | 11/1995 |
| JP | 2002-183734 A | 6/2002 |

* cited by examiner

Primary Examiner—Lin Ye
Assistant Examiner—Euel K Cowan
(74) Attorney, Agent, or Firm—Birch, Stewart, Kolasch & Birch, LLP

(57) ABSTRACT

A photographing apparatus including a photographing unit for obtaining an image by photographing, a face detection unit for detecting a face candidate included in the image, a face component detection unit for detecting a candidate of at least one of face components included in the face candidate with respect to each of the face components, and a determination unit for determining whether or not the face candidate is a true face based on the number of face component candidates detected with respect to each of the face components.

15 Claims, 15 Drawing Sheets

FIG.10

|  | LIKELIHOOD(%) |
|---|---|
| LEFT EYE OUTER CORNER CANDIDATE 1 | 0 |
| LEFT EYE OUTER CORNER CANDIDATE 2 | 2 |
| LEFT EYE OUTER CORNER CANDIDATE 3 | 9 |
| LEFT EYE OUTER CORNER CANDIDATE 4 | 17 |
| ⋮ | ⋮ |

FIG.11

|  | FACE CANDIDATE 1 AVERAGE LIKELIHOOD VALUE(%) | FACE CANDIDATE 2 AVERAGE LIKELIHOOD VALUE(%) |
|---|---|---|
| LEFT EYE OUTER CORNER | 15 | 1 |
| LEFT EYE INNER CORNER | 18 | 0 |
| RIGHT EYE OUTER CORNER | 12 | 3 |
| RIGHT EYE INNER CORNER | 15 | 0 |
| LEFT NOSTRIL SIDE | 16 | 4 |
| RIGHT NOSTRIL SIDE | 14 | 2 |
| LEFT MOUTH CORNER | 12 | 1 |
| RIGHT MOUTH CORNER | 15 | 0 |
| MOUTH CENTER | 10 | 0 |

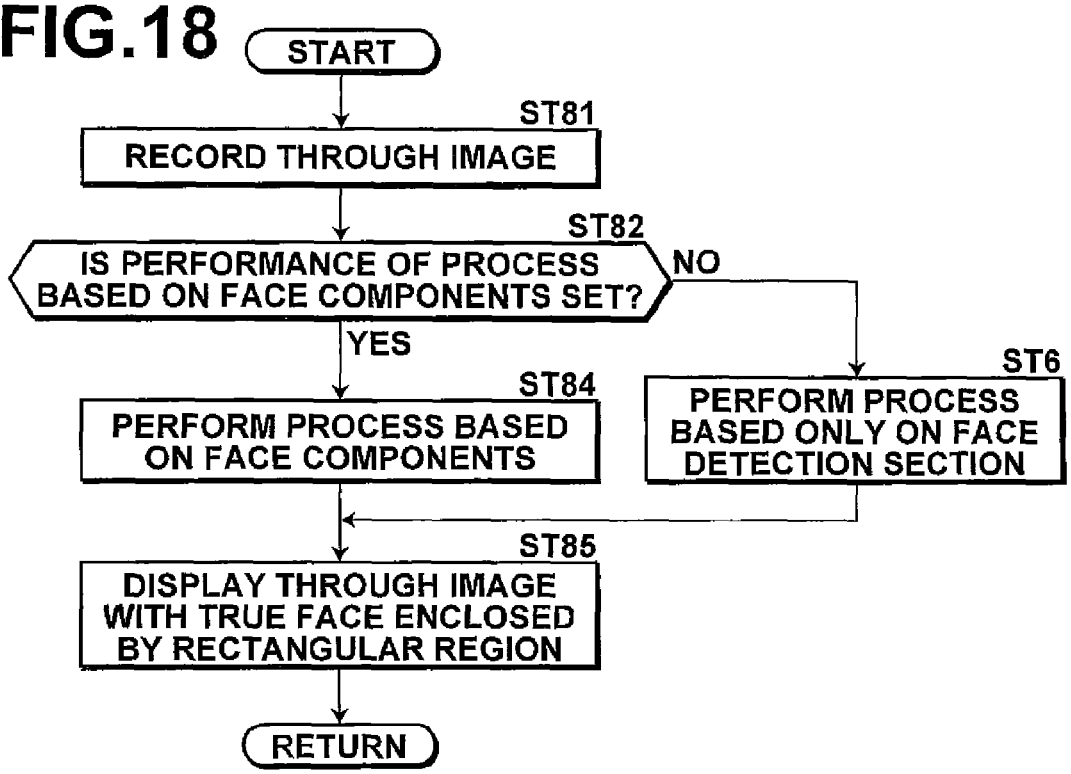
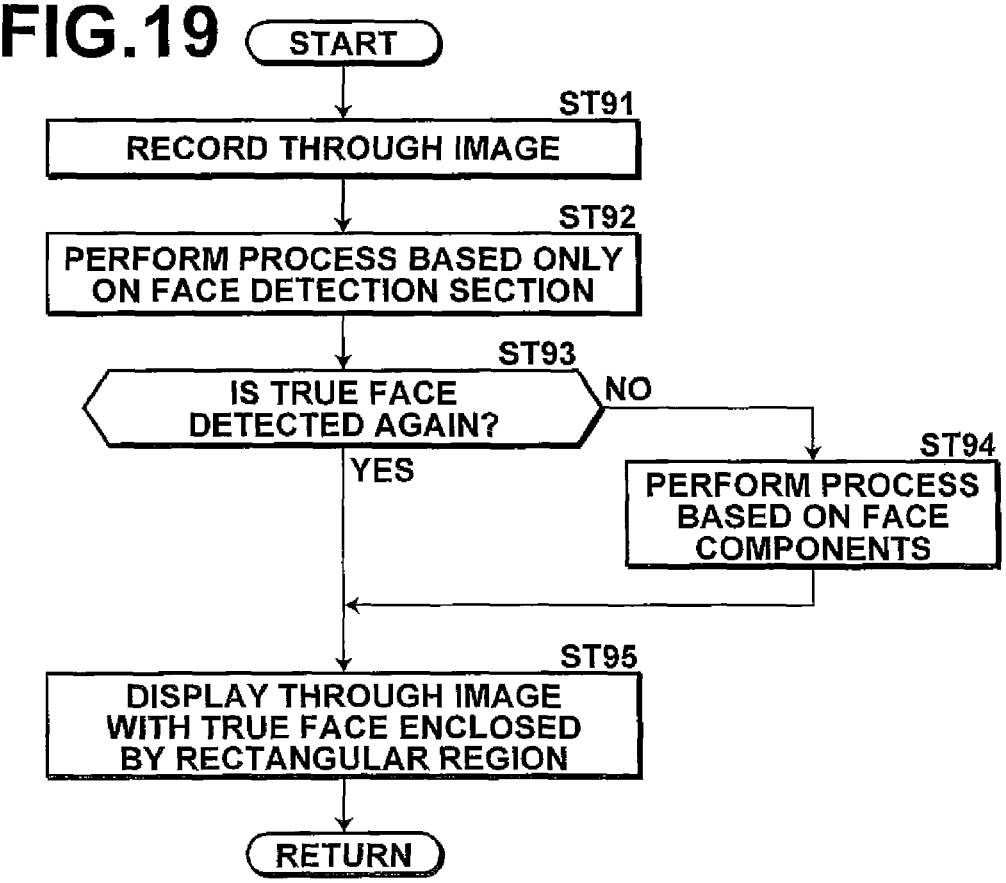

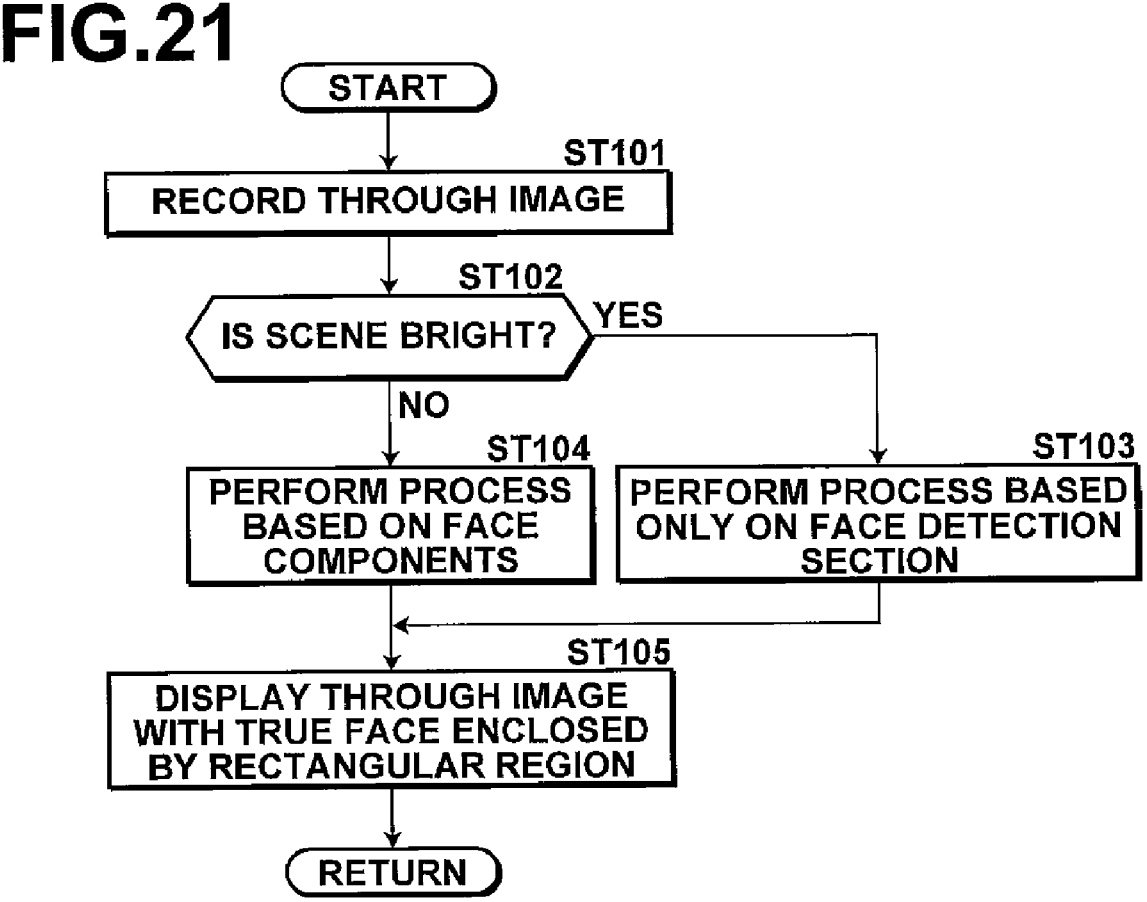

PHOTOGRAPHING APPARATUS, METHOD AND COMPUTER PROGRAM PRODUCT

BACKGROUND OF THE INVENTION

1. Field of the Invention

The present invention relates to a photographing apparatus and method for obtaining an image by photographing, such as a digital camera, and the like. The invention also relates to a computer program product for causing a computer to perform the photographing method.

2. Description of the Related Art

In photography with digital cameras, it is customary to detect a target object, such as a face or the like, from an image obtained by photographing and to change the conditions for image processing performed on the image or photographing conditions when photographing according to the detection result of the target object. When the target object is a face, in particular, it is also customary to count the number of detected faces and to record the image after trimming the detected faces.

For detecting a target object from an image and performing various types of image processing on the image as described above, it is necessary to accurately detect the target object from the image. Consequently, different methods for accurately detecting a target object have been proposed. For example, a method is proposed as described, for example, in Japanese Unexamined Patent Publication No. 2002-183734, in which when authenticating the identity of an authentication target person by photographing a face image of the authentication target person, extracting a characteristic amount of the face of the target authentication person from the face image, calculating a similarity level between the extracted characteristic amount and a reference characteristic amount, and making a comparison between the calculated similarity level and a threshold value, the threshold value is changed according to whether or not the authentication is performed within a high use time of the authentication target person, thereby improving the successful authentication ratio during the high use time of the authentication target person.

Another method is also proposed as described, for example, in U.S. Patent Application Publication No. 20050069208, in which face candidates are detected from an image, and a face candidate that does not satisfy predetermined conditions, such as the case where the color dispersion value of the face candidate is small, or the occupation ratio of a flesh color region is large, is determined to be a non-face and precluded from detected face candidates.

The methods described in the aforementioned patent publications may improve face authentication accuracy or face detection accuracy, but the demand for further improving the accuracy still exists.

The present invention has been developed in view of the circumstances described above, and it is an object of the present invention to further improve the accuracy for detecting a face from an image.

SUMMARY OF THE INVENTION

There is a big difference between a face and a non-face that the face includes face components, such as eyes, a nose, a mouth, and the like, while the non-face does not. Accordingly, consideration of the face components may provide effective clues for determining whether or not a face candidate included in an image is a true face. The present invention has been developed by focusing the attention on this point.

That is, a first photographing apparatus according to the present invention is an apparatus including:

a photographing means for obtaining an image by photographing;

a face detection means for detecting a face candidate included in the image;

a face component detection means for detecting a candidate of at least one of face components included in the face candidate with respect to each of the face components; and a determination means for determining whether or not the face candidate is a true face based on the number of face component candidates detected with respect to each of the face components.

The referent of "face components" as used herein means components included in a face, and more specifically, inner corners of both eyes, outer corners of both eyes, sides of left and right nostrils, left and right corners of mouth, a central portion of mouth, and the like may be used as the face components. Here, if a face candidate is a true face, it is often the case that not only a single face component candidate is detected at the position corresponding to each of the face components but also a plurality of candidates is detected distributed around the position corresponding to each of the face components. Consequently, in the present invention, one or more face component candidates are detected with respect to each of the face components.

A second photographing apparatus according to the present invention is an apparatus including:

a photographing means for obtaining an image by photographing;

a face detection means for detecting a face candidate included in the image;

a face component detection means for detecting a candidate of a plurality of face components included in the face candidate with respect to each of the face components; and a determination means for determining whether or not the face candidate is a true face based on the position of the face component candidate detected with respect to each of the face components.

In the second photographing apparatus according to the present invention, the determination means may be a means for calculating a positional likelihood of each of the face component candidates within the region of the face candidate with respect to the corresponding face component, and determining whether or not the face candidate is a true face based on the positional likelihood.

Further, in the second photographing apparatus according to the present invention, the determination means may be a means for calculating a positional relationship likelihood of each of the face component candidates within the region of the face candidate with respect to the face components other than the corresponding face component, and determining whether or not the face candidate is a true face based on the positional relationship likelihood.

Still further, in the second photographing apparatus according to the present invention, the determination means may be a means for normalizing the face candidate such that the position of each of the face component candidates corresponds to the position of the corresponding face component within the region of the face candidate, and determining whether or not the face candidate is a true face based on the position of each of the face component candidates within the normalized face candidate.

The referent of "normalizing the face candidate" as used herein means placing each of the face component candidates at the proper position thereof within the region of the face candidate. More specifically, each of the face component candidates may be placed at the proper position thereof by scaling, translating and rotating each of the face components through an affine transformation of the image within the region of the face candidate.

A third photographing apparatus according to the present invention is an apparatus including:

a photographing means for obtaining an image by photographing;

a face detection means for detecting a face candidate included in the image;

a face component detection means for detecting a candidate of a plurality of face components included in the face candidate with respect to each of the face components; and a determination means for determining whether the face candidate is a true face, a non-face, or an ambiguous face based on the number of face component candidates detected with respect to each of the face components, and determining whether or not the face candidate determined to be an ambiguous face is a true face based on the position of the face component candidate detected with respect to each of the face components for the face candidate determined to be an ambiguous face.

In the first to third photographing apparatuses according to the present invention, the face detection means may be a means for moving a detection frame, having a predetermined size, for detecting a face on the image to calculate a characteristic amount from the image within the detection frame at each moved position thereof, calculating a matching level between the calculated characteristic amount and a predetermined face characteristic amount, and when the matching level is greater than or equal to a predetermined threshold value, selecting whether to detect the image at the position of the detection frame as a face candidate or as a true face based on a predetermined condition.

Further, in the first to third photographing apparatuses according to the present invention, in a case where the photographing means is a means for obtaining images continuously, the face detection means may be a means for detecting, with respect to the images obtained continuously, the image at the position of the detection frame as a true face, and when the true face is not detected any longer, detecting the image at the position of the detection frame as a face candidate.

In the third photographing apparatus according to the present invention, in a case where the photographing means is a means for obtaining images continuously, the face detection means may be a means for detecting, with respect to the images obtained continuously, the image at the position of the detection frame as a true face, and when the scene brightness of the image does not satisfy a predetermined condition any longer, detecting the image at the position of the detection frame as a face candidate.

A first photographing method according to the present invention is a method including the steps of:

obtaining an image by photographing;

detecting a face candidate included in the image;

detecting a candidate of at least one of face components included in the face candidate with respect to each of the face components; and determining whether or not the face candidate is a true face based on the number of face component candidates detected with respect to each of the face components.

A second photographing method according to the present invention is a method including the steps of:

obtaining an image by photographing;

detecting a face candidate included in the image;

detecting a candidate of a plurality of face components included in the face candidate with respect to each of the face components; and determining whether or not the face candidate is a true face based on the position of the face component candidate detected with respect to each of the face components.

A third photographing method according to the present invention is a method including the steps of:

obtaining an image by photographing;

detecting a face candidate included in the image;

detecting a candidate of a plurality of face components included in the face candidate with respect to each of the face components;

determining whether the face candidate is a true face, a non-face, or an ambiguous face based on the number of face component candidates detected with respect to each of the face components; and determining whether or not the face candidate determined to be an ambiguous face is a true face based on the position of the face component candidate detected with respect to each of the face components for the face candidate determined to be an ambiguous face.

Note that the first to third photographing methods according to the present invention may be provided in the form of computer program products for causing a computer to perform the methods.

According to the first photographing apparatus and method, a face candidate included in an image obtained by photographing is detected, and a candidate of at least one of face components included in the face candidate is detected with respect to each of the face components. Then, a determination is made as to whether or not the face candidate is a true face based on the number of face component candidates detected with respect to each of the face components. Here, a face includes face components, such as eyes, a nose, a mouth, and the like, and if a face candidate is a true face, more face component candidates are detected with respect to each of the face components. Accordingly, a true face may be detected accurately from the face candidate by determining whether or not the face candidate is a true face based on the number of face component candidates detected with respect to each of the face components.

According to the second photographing apparatus and method, a face candidate included in an image obtained by photographing is detected, and a candidate of a plurality of face components included in the face candidate is detected with respect to each of the face components. Then, a determination is made as to whether or not the face candidate is a true face based on the position of the face component candidate detected with respect to each of the face components. Here, a face includes face components, such as eyes, a nose, a mouth, and the like, and if a face candidate is a true face, each of the face component candidates locates at the position of the corresponding face component. Accordingly, a true face may be detected accurately from the face candidate by determining whether or not the face candidate is a true face based on the position of each of the face component candidates included in the face candidate.

In this case, a determination may be made more accurately as to whether or not the face candidate is a true face by normalizing the face candidate such that the position of each of the face component candidates corresponds to the position of the corresponding face component.

According to the third photographing apparatus and method, a face candidate included in an image obtained by photographing is detected, and a candidate of a plurality of face components included in the face candidate is detected with respect to each of the face components. Then, a determination is made as to whether the face candidate is a true face, a non-face, or an ambiguous face based on the detected number of face component candidates. Further, a determination is made as to whether or not the face candidate determined to be an ambiguous face is a true face based on the position of each of the face component candidates.

Here, if a comparison is made between the case in which a determination is made as to whether or not a face candidate is a true face based on the number of face component candidates and the case in which a determination is made as to whether or not a face candidate is a true face based on the position of each of the face component candidates, the former requires a less amount of calculation. Accordingly, a true face may be detected accurately from the face candidates with a less amount of calculation by making a determination only on a face candidate determined to be an ambiguous face based on the number of face component candidates as to whether or not the face candidate is a true face based on the position of each of the face component candidates thereof.

BRIEF DESCRIPTION OF THE DRAWINGS

FIG. 10 illustrates a positional likelihood calculated for each face component candidate.

FIG. 11 illustrates average values of positional likelihoods of face component candidates with respect to the respective face components of two face candidates.

FIG. 18 is a flowchart illustrating a process performed in the sixth embodiment.

FIG. 19 is a flowchart illustrating a process performed in the seventh embodiment.

FIG. 21 is a flowchart illustrating a process performed in the eighth embodiment.

DESCRIPTION OF THE PREFERRED EMBODIMENTS

Figure 1:
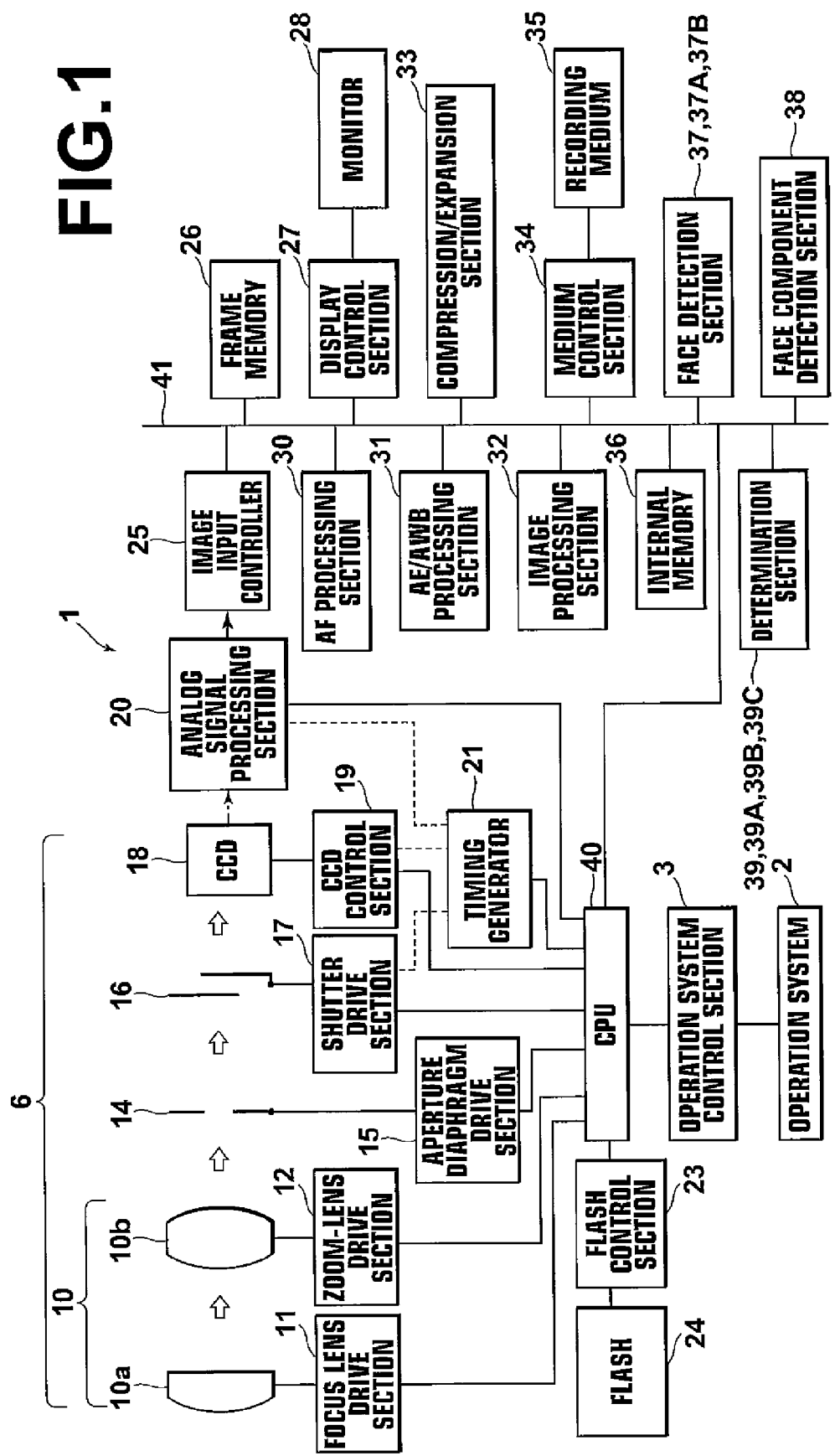
FIG. 1 is a schematic block diagram of a digital camera to which the photographing apparatus according to a first embodiment of the present invention is applied, illustrating the configuration thereof.

Hereinafter, exemplary embodiments of the present invention will be described with reference to the accompanying drawings. FIG. 1 is a schematic block diagram of a digital camera to which the photographing apparatus according to a first embodiment of the present invention is applied, illustrating the configuration thereof. As illustrated in FIG. 1, the digital camera 1 according to the present embodiment includes an operation system 2 including an operation mode switch, a zoom-lever, an up, down, left, right button, a release button, a power switch, and the like, and an operation system control section 3, which is an interface section for transferring operational contents of these switches to a CUP 40.

As for an imaging system 6, the digital camera 1 includes a focus lens 10a and a zoom lens 10b which form a photographing lens 10. Each of the lenses is movable along the optical axis directions by a focus lens drive section 11 and a zoom-lens drive section 12 respectively, each of which including a motor and a motor driver. The focus lens drive section 11 controls movement of the focus lens 10a based on focus drive amount data outputted from an AF processing section 30. The zoom-lens drive section 12 controls movement of the zoom-lens 10b based on operated amount data of the zoom-lever.

An aperture diaphragm 14 is driven by an aperture diaphragm drive section 15 that includes a motor and a motor driver. The aperture diaphragm drive section 15 controls the aperture diameter of the aperture diaphragm based on aperture value data outputted from an AE/AWB processing section 31.

A shutter 16 is a mechanical shutter, and is driven by a shutter drive section 17 which includes a motor and a motor driver. The shutter drive section 17 performs open/close control of the shutter 16 based on a signal generated when the release button is depressed and shutter speed data outputted from the AE/AWB processing section 31.

A CCD 18, which is an image sensor, is provided on the rear side of the optical system. The CCD 18 has a photoelectric surface that includes multitudes of light receiving elements disposed two-dimensionally, and the light representing a subject image transmitted through the optical system is focused on the photoelectric surface and subjected to a photoelectric conversion. A microlens array for directing light to respective pixels, and a color filter array including A, G, and B filters arranged regularly are disposed in front of the photoelectric surface. The CCD 18 reads out charges stored in the respective pixels line by line in synchronization with a vertical transfer clock signal and a horizontal transfer clock signal supplied from a CCD control section 19, and outputs the charges as serial analog image signals. The charge storage time of each pixel, that is, exposure time is determined by an electronic shutter drive signal supplied from the CCD control section 19. The CCD 18 is gain adjusted by the CCD control section 19 so that an analog image signal having a predetermined magnitude is obtained.

The photographing lens 10, aperture 14, shutter 16, and CCD 18 constitute the imaging system 6.

The analog image signals obtained by the CCD 58 are inputted to an analog signal processing section 20. The analog signal processing section 20 includes: a correlated double sampling circuit (CDS) for removing noise from the analog signals; an automatic gain controller (AGC) for controlling the gain of the analog signals; and an A/D converter (ADC) for converting the analog signals to digital signals. The processing performed by the analog signal processing section 20 is referred to as the analog signal processing. The image data converted to digital signals are CCD-RAW data in which each pixel has RGB density values.

A timing generator 21 is a generator for generating timing signals, which are inputted to the shutter drive section 17, CCD control section 19, analog signal processing section 20, thereby the operation of the release button, open/close of the shutter 16, charge acquisition of the CCD 18, and the processing of the analog signal processing section 20 are synchronized.

A flash control section 23 causes a flash 24 to emit light when photographing.

An image input controller 25 writes the CCD-RAW data, inputted from the analog signal processing section 20, into a frame memory 26.

The frame memory 26 is a work memory used when various types of digital image processing (signal processing) are performed on the image data, and, for example, a SDRAM (Synchronous Dynamic Random Access Memory) is used, which performs data transfer in synchronization with a bus clock signal having a constant period.

A display control section 27 is a control section for causing a monitor 18 to display image data stored in the frame memory 26 as a through image, or to display image data stored in the recording medium 35 when in playback mode. The through image is obtained by the CCD 18 at predetermined time intervals while photographing mode is selected.

The AF processing section 30 and AWB processing section 31 determine photographing conditions based on a pre-image. The pre-image is an image based on the image data stored in the frame memory 16 as a result of pre-photographing performed by the CCD 18, which is caused by the CPU 40 that detects a halfway depressed signal generated when the release button is depressed halfway.

The AF processing section 30 detects the focus position based on the pre-image, and outputs focus drive amount data (AF processing). As for the method for detecting the focus position described above, the passive system may be used, which detects an in-focus position by making use of the fact that image contrast becomes high when a desired subject is focused.

The AE/AWB processing section 31 measures subject brightness based on the pre-image, determines ISO sensitivity, aperture value, shutter speed, and the like based on the measured subject brightness, and determines the ISO sensitivity data, aperture value data and shutter speed data as exposure setting values (AE processing), as well as automatically adjusting the white balance at the time of photographing (AWB processing). Note that the exposure and white balance may be manually set by a photographer of the digital camera 1 when the photographing mode is set to manual mode. Further, even in the case where the exposure and white balance is set automatically, the operator may give instructions through the operation system 2 to manually adjust the exposure and white balance.

The image processing section 32 performs image quality corrections, such as, tone correction, sharpness correction, color correction, and the like on the image data of a main image. In addition, it performs YC processing in which CCD-RAW data are converted to Y data, which are luminance signal data, and YC data that include Cb data, which are blue chrominance difference signals, and Cr data, which are red chrominance difference signals. The referent of "main image" as used herein means an image based on the image data picked up by the CCD 18 when main photographing, which is implemented by fully depressing the release button, is performed and stored in the frame memory 26 through the analog signal processing section 20 and the image input controller 25. The upper limit of the number of pixels of the real image is dependent on the number of pixels of the CCD 18. But the number of pixels for recording may be changed, for example, through fine or normal setting, or the like. In the mean time, the number of pixels for a through image or a pre-image may be less than that of a real image, e.g., $1/16$ of the main image.

A compression/expansion processing section 33 generates, for example, a JPEG format image file by performing compression on the image data after image quality correction and conversion are performed by the image processing section 32. Tag information including auxiliary information, such as the date and time of photographing, and the like, based on, for example, Exit format or the like, is attached to the image file. Further, the compression/expansion processing section 33 reads out a compressed image file from the recording medium 35 and performs expansion thereon in playback mode. The expanded image data are outputted to the monitor 18 to display the image of the image data.

The medium control section 34 accesses the recording medium 35 to control read/write operations of the image files.

An internal memory 36 stores various constants to be set within the digital camera 1, a program to be performed by the CPU 40, and the like.

A face detection section 37 detects all of face candidates included in an image obtained by photographing. Here, the image may be a through image, a pre-image, or a main image. As for the face detection method, the following method is used. That is, a method in which a detection frame having a certain size is moved, bit by bit, on an image to calculate a characteristic amount of the image within the detection frame at each moved position of the detection frame, then a matching level between the calculated characteristic amount and a predetermined face characteristic amount is calculated, and a position of the detection frame where the matching level is greater than or equal to a threshold value Th0 is detected as a face candidate. Note that face candidates having different sizes may be detected by changing the size of the detection frame.

Figure 2:
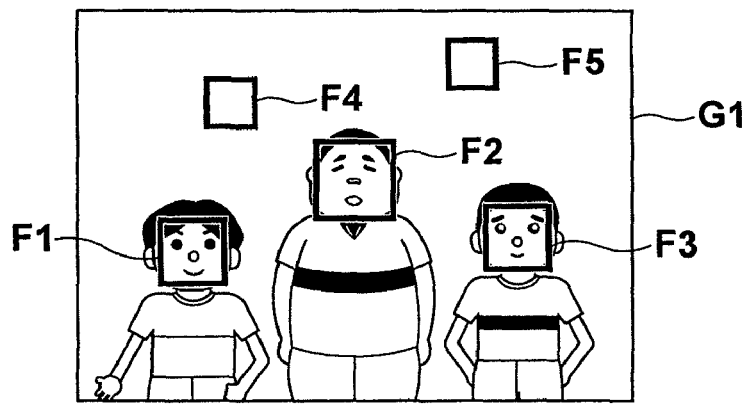
FIG. 2 illustrates how to detect face candidates.

This allows face candidates F1 to F5 enclosed by rectangular frames to be detected from an image G1 as illustrated in FIG. 2. FIG. 2 includes regions enclosed by the detection frames where faces are not present, since it is a candidate of a face that is detected.

Note that the face candidate detection method is not limited to this, and any method may be used, such as, for example, a method in which a rectangular region of an image having a flesh color and enclosing a contour shape of a face is detected as a face candidate, or a region having a contour shape of a face is detected as a face candidate.

A face component detection section 38 detects a face component candidate which is a candidate with respect to a plurality of face components included in a face candidate. In the present embodiment, a face component candidate is detected with respect to nine face components K1 to K9, namely outer corners of both eyes K1, K2, inner corners of both eyes K3, K4, sides of left and right nostrils K5, K6, left and right mouth corners K7, K8, and the central portion of the mouth K9.

More specifically, each rectangular face component pattern is moved, bit by bit, on an image within the region of a processing target face candidate to calculate a matching level at each moved position, and coordinates of the position of the pattern where the matching level is greater than or equal to a predetermined threshold value Th1 is detected as a face component candidate. Here, the coordinates described above are coordinates within a face candidate region with their origin at the upper left corner of the face candidate region.

When a face candidate is a true face, if a position of the pattern where the matching level is greater than or equal to the threshold value Th1 is detected as a face component candidate, it is often the case that not only a single face component candidate is detected at the position corresponding to each of the face components K1 to K9 but a plurality of candidates is detected distributed around the position corresponding to each of the face components K1 to K9. Consequently, the face component detection section 38 detects one or more face component candidates with respect to each of the face components.

Figure 3A:
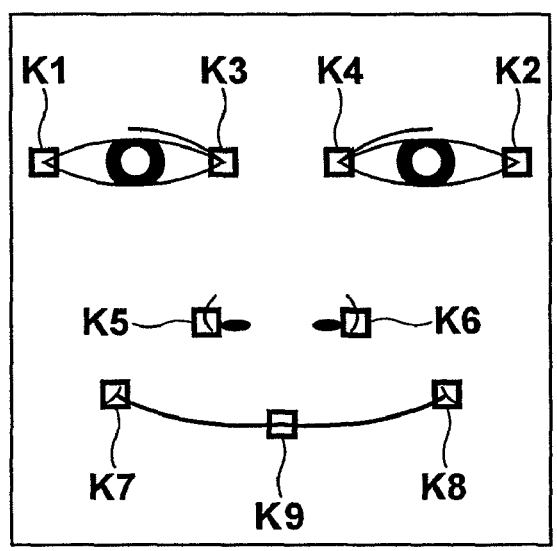
FIGS. 3A, 3B illustrate how to detect face component candidates.
Figure 3B:

Here, if a face candidate includes each of the nine face components K1 to K9, face component candidates respectively corresponding to the nine face components are detected, namely outer corners of both eyes K1, K2, inner corners of both eyes K3, K4, sides of left and right nostrils K5, K6, left and right mouth corners K7, K8, and the central portion of the mouth K9, as shown in FIG. 3A. Further, for example, with respect to the inner corner of the left eye, a plurality of face component candidates is detected, as indicated by the "x" marks in FIG. 3B.

Where a face component candidate with the matching level greater than or equal to the threshold value Th1 is not detected, it is determined that the candidate corresponding to the face component is not detected.

A determination section 39 determines whether or not each face candidate detected by the face detection section 37 is a true face based on the number of face component candidates with respect to each of the face components, and detects a face candidate determined to be a true face as a true face. More specifically, each of the sums N1 to N9 of face component candidates with respect to each of the nine face components K1 to K9 is calculated for processing target face candidates of all of the face candidates, and further Nsum, which is the add-up total of the sums N1 to N9, is calculated. Then, if the add-up total Nsum is greater than or equal to a threshold value Th2, the processing target face candidate is determined to be a true face, and the face candidate is detected as a true face. When the add-up total Nsum is smaller than the threshold value Th2, the processing target face candidate is determined to be a non-face.

Figure 4A:
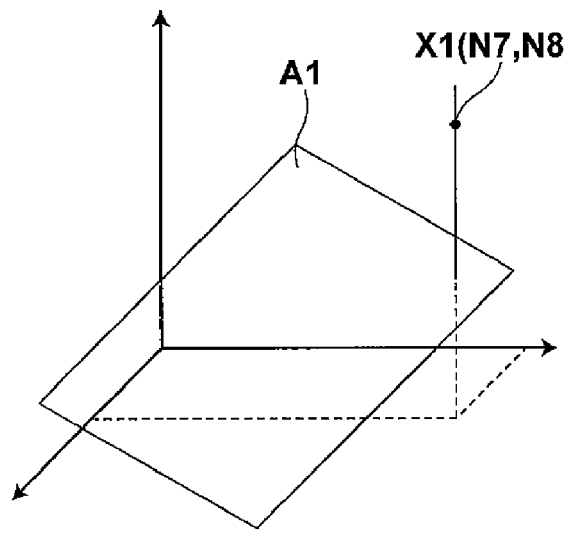
FIGS. 4A, 4B illustrate how to determine whether or not a face candidate is a true face.
Figure 4B:
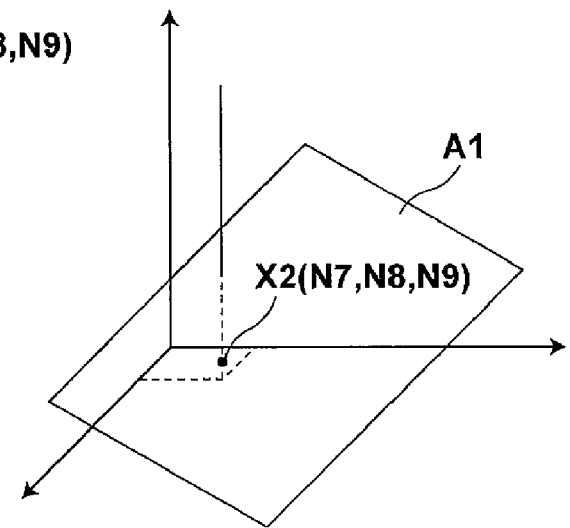

Note that the determination as to whether or not a processing target face candidate is a true face may also be made by plotting each of the sums N1 to N9 of face component candidates with respect to each of the nine face components K1 to K9 on a nine-dimensional space, setting a hyperplane or hypersurface that determines a threshold value in the nine-dimensional space, and determining whether or not the processing target face candidate is a true face according to on which side, the hyperplane or hypersurface, the plotted sums N1 to N9 locate. Here, if the face components used for the determination are limited to the left and right mouth corners K7, K8, and the central portion of the mouth K9 for simplicity, the sums N7 to N9 are plotted on a three-dimensional space. FIGS. 4A, 4B illustrate the three-dimensional space with the sums N7 to N9 plotted thereon. If the sums N7 to N9 are plotted like that shown in FIG. 4A, the plotted position X1 (N7, N8, and N9) is located on the upper side of the hyperplane A1 that determines a threshold value (i.e., on the side having a greater value). Accordingly, if the sums N7 to N9 are plotted like that shown in FIG. 4A, the processing target face candidate is determined to be a true face.

On the other hand, if the sums N7 to N9 are plotted like that shown in FIG. 4B, the plotted position X2 (N7, N8, and N9) is located on the lower side of the hyperplane A1 that determines a threshold value (i.e., on the side having a smaller value). Accordingly, if the sums N7 to N9 are plotted like that shown in FIG. 4B, the processing target face candidate is determined not to be a true face.

Note that another method may be used here in which a determination is made as to whether or not each of the sums N7 to N9 exceeds a threshold value Th3, and when the number of sums exceeding the threshold value Th3 exceeds a threshold value Th4, the processing target face candidate is determined to be a true face.

Figure 5:
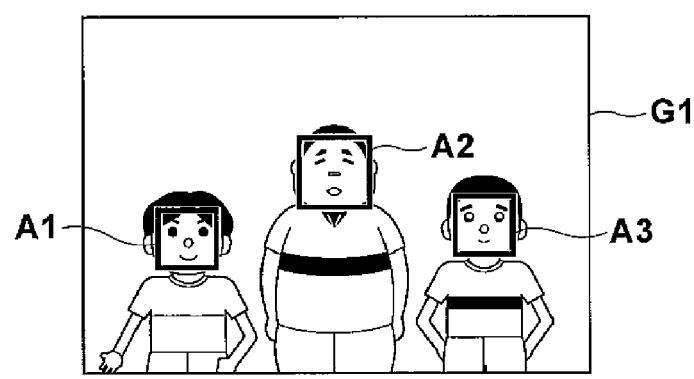
FIG. 5 illustrates a through image in which true faces are enclosed by rectangles.

The CPU 40 controls each section of the main body of the digital camera 1 in response to the signals from various sections, including the operation system 2, AF processing section 30, and the like. In addition, while photographing through images, the CPU 40 controls the face detection section 37, face component detection section 38, and determination section 39 so that a true face is detected from each of the through images. When true faces are detected by the determination section 39, the CPU 40 instructs the display control section 27 to display the through image with the detected true faces enclosed by rectangular regions A1 to A3, as illustrated in FIG. 5. Note that the rectangular regions correspond to the detection frames of the face candidates detected by the face detection section 37.

A data bus 41 is connected to the various processing sections, frame memory 26, CPU 40, and the like, and digital image data, various instructions, and the like are exchanged therethrough.

Figure 6:
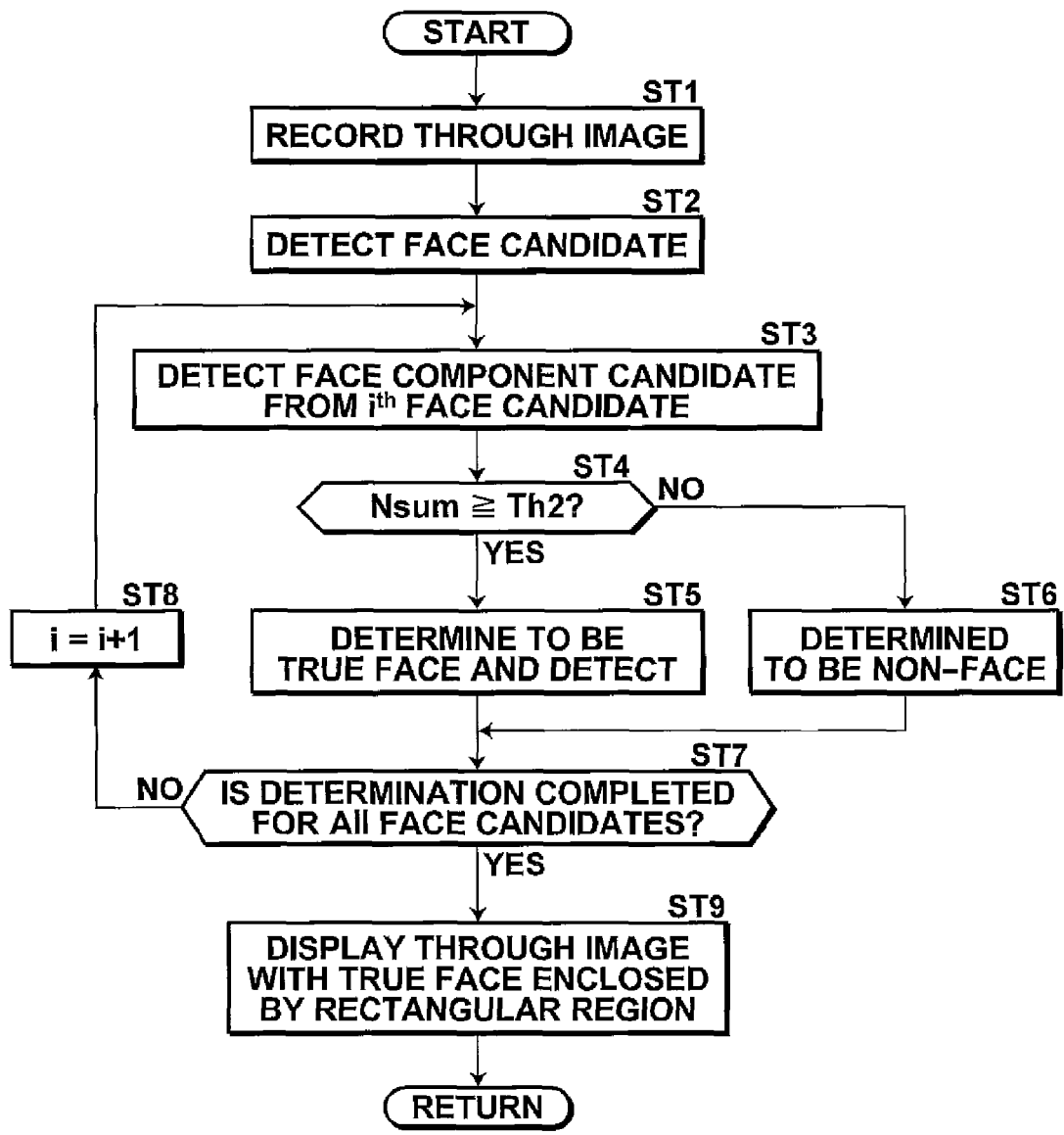
FIG. 6 is a flowchart illustrating a process performed in the first embodiment.

Next, a process performed in the first embodiment will be described. FIG. 6 is a flowchart illustrating the process performed in the first embodiment. When the operation mode of the digital camera 1 is set to photographing mode, the process is initiated by the CPU 40 and a through image is recorded (StepST1). Then, the face detection section 37 detects all of face candidates included in the through image (Step ST2).

Then, with $i^{th}$ face candidate as a processing target face candidate, the face component detection section 38 detects a face component candidate with respect to each of the face components from the processing target face (step ST3). Note that the initial value of "i" is 1. The face component detection may be performed, for example, in the order from a face candidate located on the observers' left toward the right on the through image.

Then, the determination section 39 determines whether or not the add-up total Nsum of the sum of face component candidates with respect to each of the face components detected by the face component detection section 38 is greater than or equal to the threshold value Th2 (step ST4). If the step ST4 is positive, the processing target face candidate is detected as a true face (step ST5). On the other hand, if the step ST4 is negative, the processing target face candidate is detected as a non-face (step ST6).

Following the steps ST5 and ST6, the CPU 40 determines whether or not the determination by the determination section 39 is completed for all of the face candidates (step ST7). If the step ST7 is negative, the value of "i" is incremented by one (step ST8), and the process returns to the step ST3. If the step ST7 is positive, the through image with the true face enclosed by the rectangular region is displayed on the monitor 28 (step ST9), and the process returns to step ST1.

In this way, in the first embodiment, a true face is detected from each of the face candidates based on the number of detected face component candidates. Here, a face includes face components, such as the eyes, nose, mouth, and the like, and if a face candidate is a true face, more face component candidates should be detected for a single face component. Accordingly, the determination as to whether or not a face candidate is a true face based on the number of face component candidates with respect to each face component allows accurate detection of a true face from face candidates.

In the first embodiment, the nine face components, i.e., outer corners of both eyes K1, K2, inner corners of both eyes K3, K4, sides of left and right nostrils K5, K6, left and right mouth corners K7, K8, and the central portion of the mouth K9, are detected, but not all of the components need to be detected and detection of a candidate of one or more of these face components may be satisfactory. In this case, the threshold value Th2 to be compared with the add-up total Nsum of the sums may be changed according to the number of face components to be detected. Where only a single face component is detected, it is preferable that any one of the outer corners and inner corners of both eyes be detected. Further, the face components to be detected are not limited to the outer corners of both eyes, inner corners of both eyes, sides of left and right nostrils, left and right mouth corners, and the central portion of the mouth, and any component may be used as long as it constitute a face, such as eyebrows, pupils of both eyes, and the like.

Next, a second embodiment of the present invention will be described. The second embodiment differs from the first embodiment only in the process performed by the determination section 39, so that the configuration thereof will not be elaborated upon further here.

In the second embodiment, the determination section (which is different from that of the first embodiment and referred to as the determination section 39A) calculates a positional likelihood of a face component candidate with respect to each of the face components detected by the Lace component detection section 38, and determines whether or not the face candidate is a true face based on the positional likelihood. The referent of "positional likelihood" as used herein means a probability that a detected face component candidate is located in the proper position of the corresponding face component within the region of a face candidate.

Here, in the present embodiment, a probability distribution representing the existence probability of each of nine types of face components within a face candidate is obtained in advance.

Figure 7:
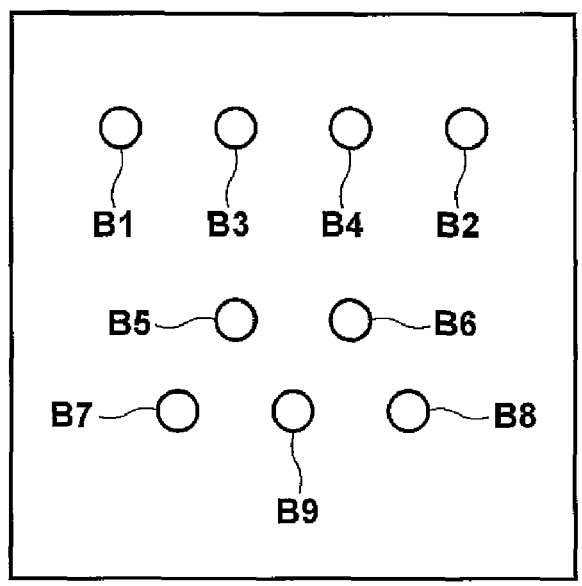
FIG. 7 illustrates a probability distribution of existence probabilities of face components.
Figure 8:
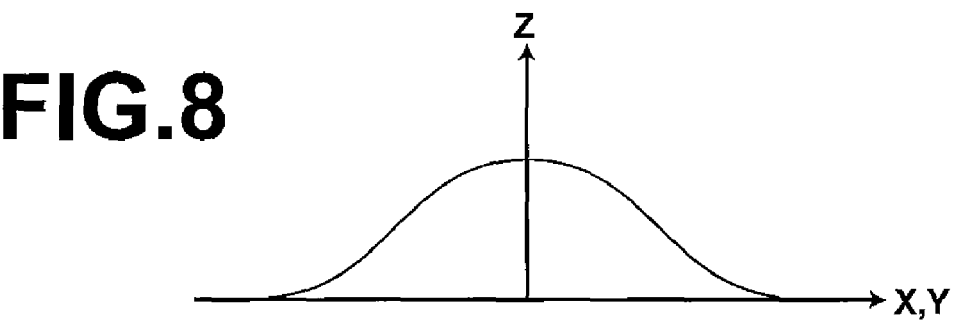
FIG. 8 illustrates the profile of the probability distribution.

FIG. 7 illustrates probability distributions representing the existence probabilities of face components. Each of the probability distributions shown in FIG. 7 represents a probability distribution of the existence probability of each of nine face components of outer corners of both eyes K1, K2, inner corners of both eyes K3, K4, sides of left and right nostrils K5, K6, left and right mouth corners K7, K5, and the central portion of the mouth K9 within the detection frame that detected the face candidate normalized to a predetermined certain size. The circles B1 to B9 in FIG. 7 indicate the probability distributions of the existence probabilities of the outer corners of both eyes K1, K2, inner corners of both eyes K3, K4, sides of left and right nostrils K5, K6, left and right mouth corners K7, K8, and the central portion of the mouth K9 respectively. If the surface of FIG. 7 is regarded as an X-Y plane with the direction perpendicular to the surface as "z" direction, then the "z" direction represents the existence probability of each face component as illustrated in the probability distribution profile of FIG. 8. Accordingly, the closer the position is to the center of each circle, the greater the existence probability of each face component.

The probability distributions may be obtained in advance using multitudes of face sample images.

Figure 9:
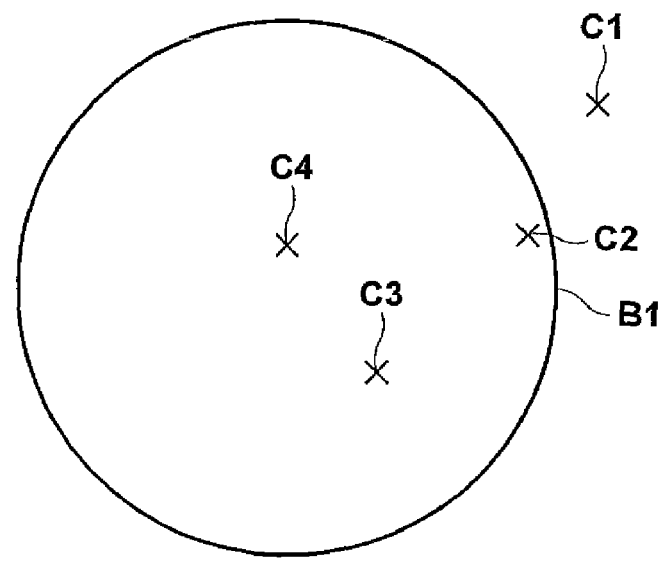
FIG. 9 illustrates example positions of face component candidates adjacent to the probability distribution.

The determination section 39A normalizes each face candidate detected by the face detection section 37 to the certain size described above, and calculates the existence probability of a face component candidate with respect to each face component within each of the normalized face candidates as a positional likelihood by referring to the probability distribution of the corresponding face component. More specifically, for each face component candidate, a position adjacent to the probability distribution representing the existence probability of the corresponding face component is obtained, and the existence probability at the position is calculated as the positional likelihood. This may provide the positional likelihood of each face component candidate, like, for example, if candidates 1 to 4 of the outer corner of the left eye are located in the positions C1 to C4 adjacent to the probability distribution B1 shown in FIG. 9, the likelihood of the left eye outer corner candidate 1 located in the position C1 is 0%, the likelihood of the left eye outer corner candidate 2 located in the position C2 is 2%, the likelihood of the left eye outer corner candidate 3 located in the position C3 is 9%, and the likelihood of the left eye outer corner candidate 4 located in the position C4 is 17%, as illustrated in FIG. 10.

Further, the determination section 39A calculates an average value of the positional likelihoods of the face component candidates with respect to each face component. FIG. 11 illustrates average values of the positional likelihoods of face component candidates with respect to the respective face components of two face candidates. Then, for a processing target face candidate, the determination section 39A determines whether or not the number of face components with the average value of positional likelihoods greater than or equal to a threshold value Th5 is greater than or equal to a threshold value Th6, and if the determination is positive, the processing target image is determined to be a true face and detected. For example, if 13% is used as the threshold Th5, and five is used as the threshold value Th6 since nine face components are used in the present embodiment, the face components with the average value of the positional likelihoods greater than or equal to the threshold value Th5 for the face candidate 1 shown in FIG. 11 are the left eye outer corner, left eye inner corner, right eye inner corner, left nostril side, right nostril side, and right mouth corner, totaling six which is greater than the threshold value Th6, so that the face candidate 1 is determined to be a true face and detected. In contrast, for the face candidate 2, the number of face components with the average value of the likelihoods greater than or equal to the threshold value Th5 is zero, so that the face candidate 2 is not determined to be a true face.

Figure 12:
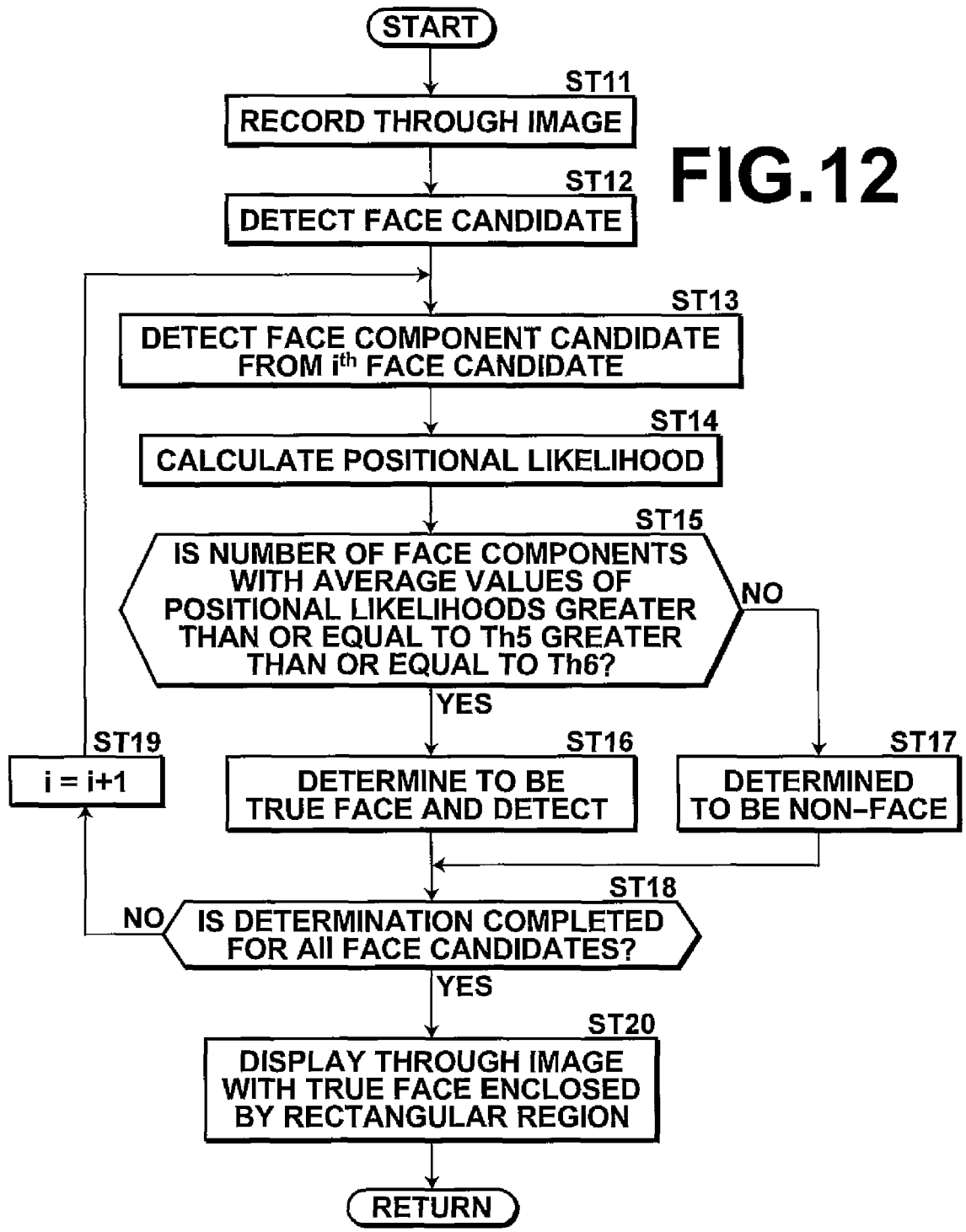
FIG. 12 is a flowchart illustrating a process performed in the second embodiment.

Next, a process performed in the second embodiment will be described. FIG. 12 is a flowchart illustrating the process performed in the second embodiment. When the operation mode of the digital camera 1 is set to photographing mode, the process is initiated by the CUP 40 and a through image is recorded (step ST11). Then, the face detection section 37 detects all of face candidates included in the through image (step ST12). Next, with $i^{th}$ face candidate as a processing target face candidate, the face component detection section 38 detects a face component candidate with respect to each of the face components from the processing target face (step ST13).

Then, the determination section 39A calculates the positional likelihood of the face component candidate with respect to each of the face components (step ST14), and determines whether or not the number of face components with the average values of the positional likelihoods greater than or equal to the threshold value Th5 is greater than or equal to the threshold value Th6 (step ST15). If the step ST15 is positive, the processing target image is determined to be a true face and detected (step ST16). On the other hand, if the step ST15 is negative, the processing target face candidate is determined to be a non-face (step ST17).

Following the steps ST16 and ST17, the CPU 40 determines whether or not the determination by the determination section 39A is completed for all of the face candidates (step ST18). If the step ST18 is negative, the value of "i" is incremented by 1 (step ST19), and the process returns to the step ST13. If the step ST18 is positive, the through image with the true face enclosed by the rectangular region is displayed on the monitor 28 (step ST20), and the process returns to step ST11.

In this way, in the second embodiment, a true face is detected from each of the face candidate based on the position of a detected face component candidate, in particular, the positional likelihood. Here, a face includes face components, such as the eyes, nose, mouth, and the like, and if a face candidate is a true face, a face component candidate should be found at the position of the corresponding face component. Accordingly, the determination as to whether or not a face candidate is a true face based on the position of a face component candidate included in the face candidate allows accurate detection of a true face from face candidates.

In the second embodiment, the determination section 39A calculates the positional likelihood of a face component candidate with respect to each of the face components, and determines whether or not the face candidate is a true face based on the calculated positional likelihood. But, the determination as to whether or not a face candidate is a true face may be made by calculating the likelihood of positional relationship of a face component candidate with respect to each of the face components and based on the calculated positional relationship likelihood. This will be described as a third embodiment hereinbelow.

In the third embodiment, the determination section (which is different from that of the first embodiment and referred to as the determination section 39B) calculates, for each face component candidate with respect to each of the face components detected by the face component detection section 38, existence probabilities with respect to other face components as a positional relationship likelihood, and determines whether or not the face candidate is a true face based on the calculated positional relationship likelihood.

Figure 13:
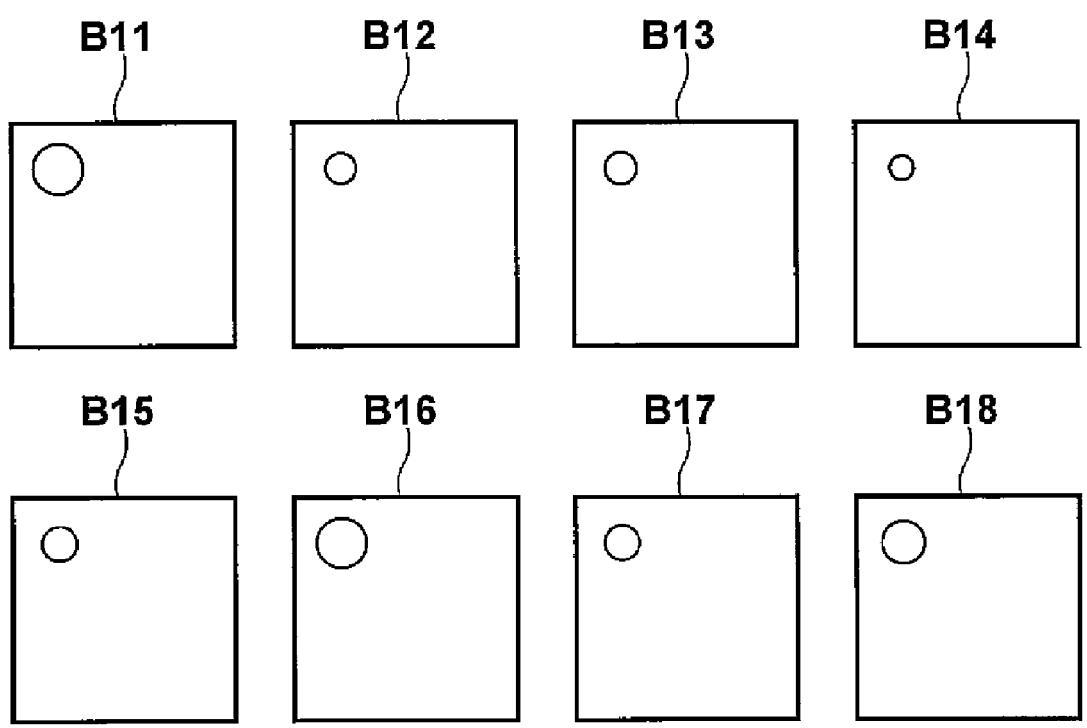
FIG. 13 illustrates probability distributions for existence probabilities of eight face components of inner corner of right eye, outer corners of both eyes, inner corner of left eye, sides of left and right nostrils, left and right mouth corners, and the central portion of mouth.

FIG. 13 illustrates probability distributions for existence probabilities of eight face components of inner corner of right eye, outer corners of both eyes, inner corner of left eye, sides of left and right nostrils, left and right mouth corners, and the central portion of mouth. In FIG. 13, the probability distributions B11 to B18 indicate the probability distributions of the right eye inner corner with respect to left eye outer corner, right eye outer corner, left eye inner corner, left nostril side, right nostril side, left mouth corner, right mouth corner, and mouth central portion respectively.

Now, if the target for calculating the positional relationship likelihoods is the right eye inner corner, the determination section 39B normalizes each face candidate detected by the face detection section 37 to a certain size in the third embodiment, as in the second embodiment, and calculates, as provisional positional relationship likelihoods, existence probabilities with respect to each of the right eye inner corner candidates detected by the face component detection section 38 within each of the normalized face candidates with reference to the probability distributions B11 to B18. The provisional positional relationship likelihoods of the right eye inner corner are calculated like that for example, 15%, 12%, 13%, 10%, 19%, 13%, 17%, and 15% with respect to left eye outer corner, right eye outer corner, left eye inner corner, left nostril side, right nostril side, left mouth corner, right mouth corner, and mouth central portion respectively.

Then, the determination section 39B obtains the average value of the calculated eight provisional positional relationship likelihoods, and further calculates the average value of the average values of all of the face component candidates as the final positional relationship likelihood of the face component.

Note that, in the third embodiment, the probability distributions of existence probabilities for the left eye outer corner, right eye outer corner, left eye inner corner, left nostril side, right nostril side, left mouth corner, right mouth corner, and mouth central portion with respect to other face components are obtained as well as for the right eye inner corner, and the determination section 39B calculates the positional relationship likelihood for the face component candidates of all of the nine face components. Then, the determination section 39B determines whether or not the number of face components with the positional relationship likelihoods, calculated with respect to the respective face components for the nine face component candidates, greater than or equal to a threshold value Th7 is greater than or equal to a threshold value Th8, and if the determination is positive the processing target face candidate is determined to be a true face and detected.

Figure 14:
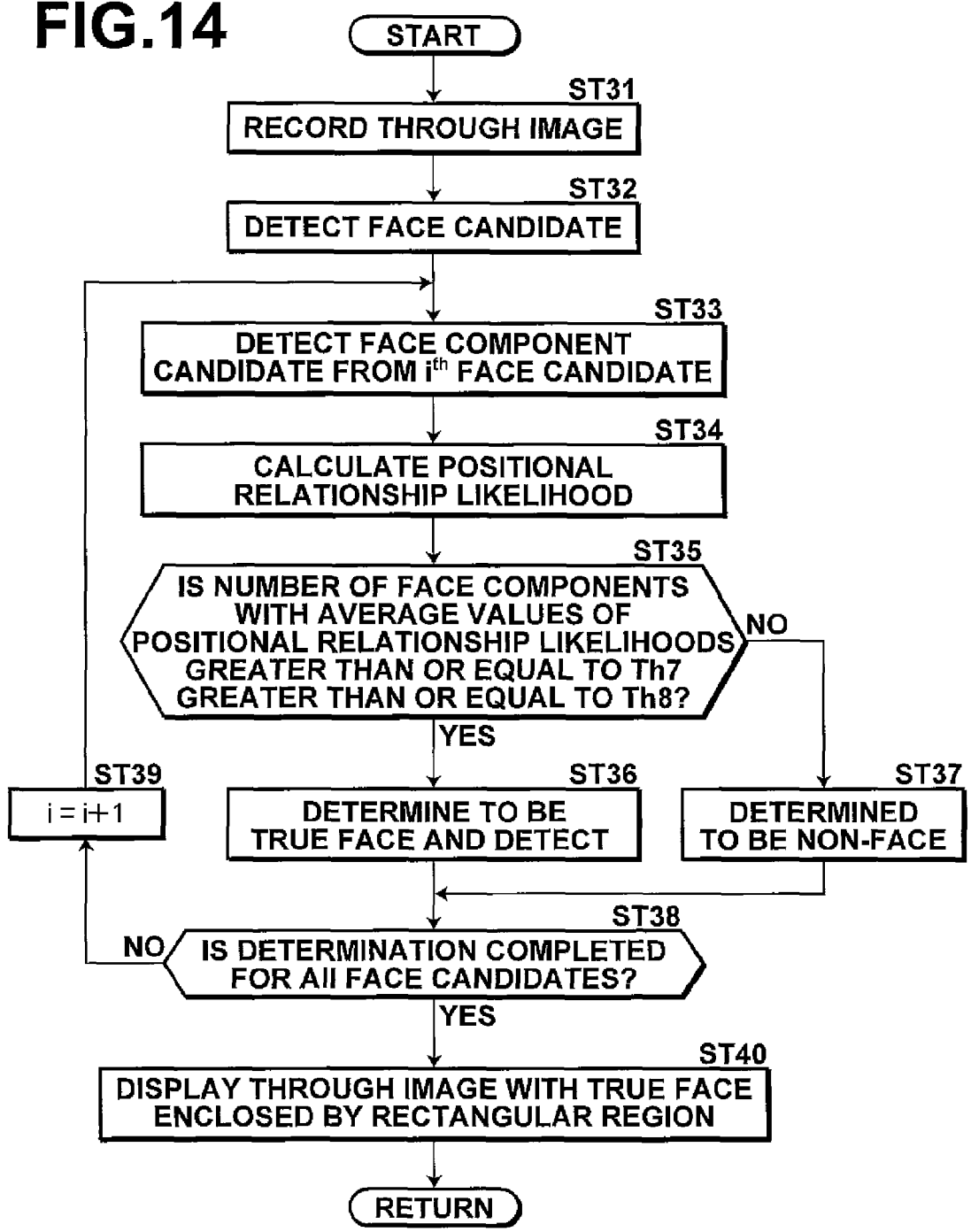
FIG. 14 is a flowchart illustrating a process performed in the third embodiment.

Next, a process performed in the third embodiment will be described. FIG. 14 is a flowchart illustrating the process performed in the third embodiment. When the operation mode of the digital camera 1 is set to photographing mode, the process is initiated by the CUP 40 and a through image is recorded (step ST31). Then, the face detection section 37 detects all of face candidates included in the through image (step ST32). Next, with $i^{th}$ face candidate as a processing target face candidate, the face component detection section 38 detects a face component candidate with respect to each of the face components from the processing target face (step ST33). Note that the initial value of "i" is 1.

Then, the determination section 39B calculates the positional relationship likelihood of the face component candidates with respect to each of the face components (step ST34), and determines whether or not the number of face components with the positional relationship likelihoods greater than or equal to the threshold value Th7 is greater than or equal to the threshold value Th8 (step ST35). If the step ST35 is positive, the processing target face candidate is determined to be a true face (step ST36). On the other hand, if the step ST 35 is negative, the processing target face candidate is determined to be a non-face (step ST37).

Following the steps ST36 and ST37, the CPU 40 determines whether or not the determination by the determination section 39B is completed for all of the face candidates (step ST38). If the step ST38 is negative, the value of "i" is incremented by 1 (step ST39), and the process returns to the step ST33. If the step ST38 is positive, the through image with the true face enclosed by the rectangular region is displayed on the monitor 28 (step ST40), and the process returns to step ST31.

In this way, in the third embodiment, a true face is detected from each of the face candidates based on the position of a detected face component candidate, in particular, the positional relationship likelihood. Here, a face includes face components, such as the eyes, nose, mouth, and the like, and if a face candidate is a true face, a face component candidate should be found at the position of the corresponding face component and further the relationships among the face components are substantially fixed. Accordingly, determination as to whether or not a face candidate is a true face based on a positional relationship of a face component candidate included in the face candidate allows accurate detection of a true face from face candidates.

In the third embodiment, the positional relationship likelihood of all of the nine types of face components are calculated, and a determination is made as to whether or not a face candidate is a true face based on whether or not the number of face components with the positional relationship likelihoods greater than or equal to the threshold value Th7 is greater than or equal to the threshold value Th8. But, not all of the nine types of face components need to be used, and a determination may be made as to whether or not a face candidate is a true face based on the positional relationship likelihood of at least one face component.

Figure 15:
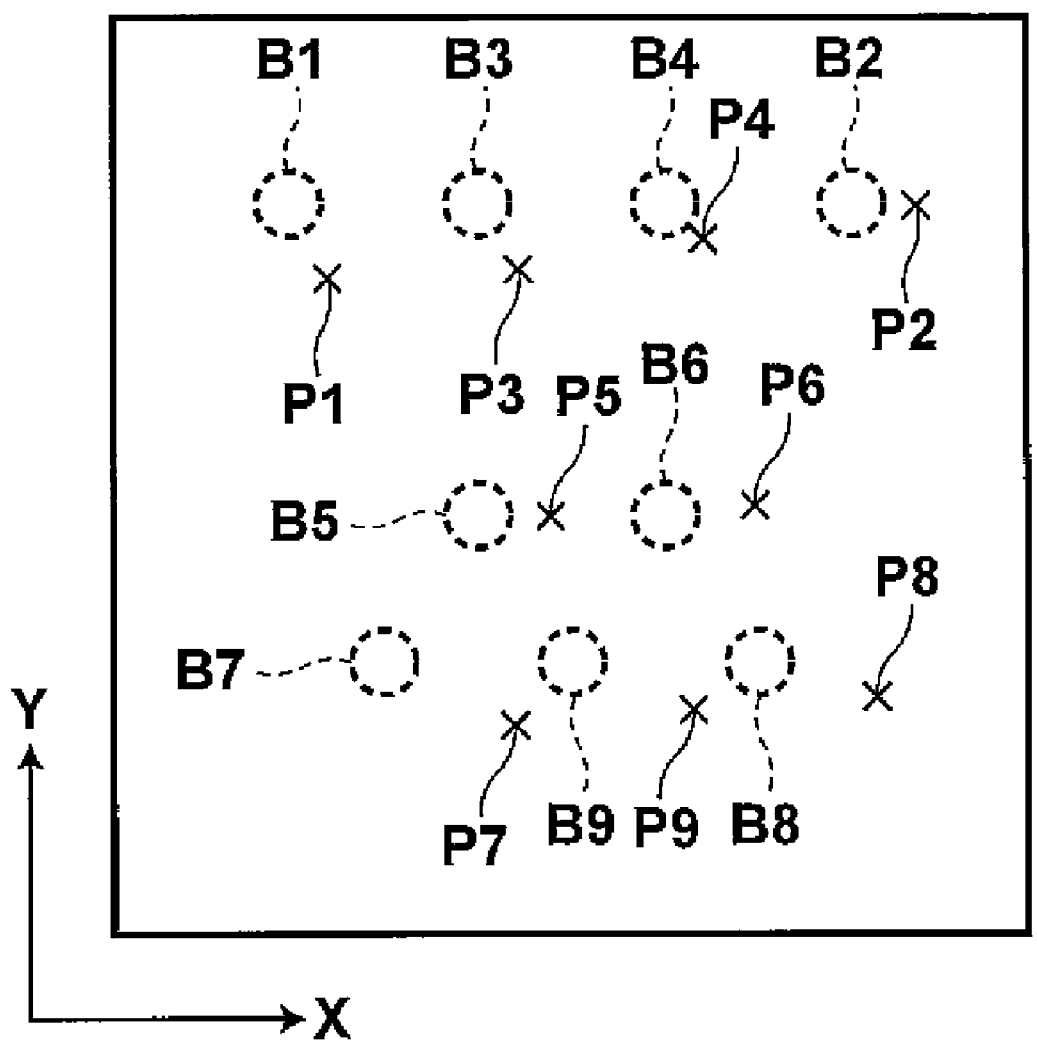
FIG. 15 illustrates positional displacement of face components.

Further, in the second and third embodiments described above, when each of the detected face component candidates is found on the probability distribution of the corresponding face component, the positional likelihood and positional relationship likelihood may be calculated accurately. But, as illustrated in FIG. 15, if the positions of the respective face component candidates (indicated by "x" marks in FIG. 15) are displaced from the probability distributions of the proper positions of the corresponding face components, the likelihood is not calculated accurately. As a result, a determination is not made accurately as to whether or not a face candidate is a true face. Consequently, it is preferable to normalize a face candidate such that a detected face component candidate is placed on a position within the probability distribution, which will be described as a fourth embodiment hereinbelow.

In the fourth embodiment, in order to normalize a face candidate, an affine transformation is performed on the image of the face candidate such that either one of the face components of the face candidate corresponds to the center (i.e., the position of the highest probability) of the corresponding face component. The affine transformation is a transformation that moves any three points on a plane to arbitrary three points by performing a scaling, translation, and rotation, and specifically represented by the formula (1) shown below.

$$x'=a1\cdot x+b1\cdot y+d1$$

$$y'=a2\cdot x+b2\cdot y+d2 \quad (1)$$

In order to calculate the affine transformation coefficients a1, a2, b1, b2, d1, and d2 by the formula (1), coordinates of three points are required within a face candidate and probability distributions of face components corresponding to each other. Here, in a face candidate and probability distributions of face components, if an XY coordinate system with its origin at the bottom left corner is considered as illustrated in FIG. 15, it is necessary to set the affine transformation coefficients such that the face component candidates P1 to P9 locate in the centers of the probability distributions B1 to B9 respectively. In the fourth embodiment, at least one of the face components having a highest matching level detected by the face component detection section 38 with respect to each of the face components is selected as each of the face component candidates P1 to P9 representing the face component candidates. Then, the affine transformation coefficients are calculated such that top three candidates of the nine face component candidates P1 to P9 having large matching levels correspond to the centers of the probability distributions of the corresponding face components.

For example, if the matching levels of the face component candidates P1 to P9 are P1>P2>P3>P4>P5 - - -, the affine transformation coefficients a1, a2, b1, b2, d1, and d2 are calculated such that the face component candidates P1, P2, and P3 correspond to the centers of the probability distributions B1, B2, and B3 of the corresponding face components.

Note that coordinates of four or more points may be used to calculate the affine transformation coefficients, instead of using coordinates of three points. For example, the affine transformation coefficients are calculated such that all of the nine face component candidates P1 to P9 correspond to the centers of the probability distributions B1 to B9 of the corresponding face components. In this case, the affine transformation coefficients may be calculated using the least-square method such that the difference between the coordinates of each of the nine face component candidates P1 to P9 after transformation and the coordinates of the center of each of the probability distributions B1 to B9 is minimized.

Figure 16:
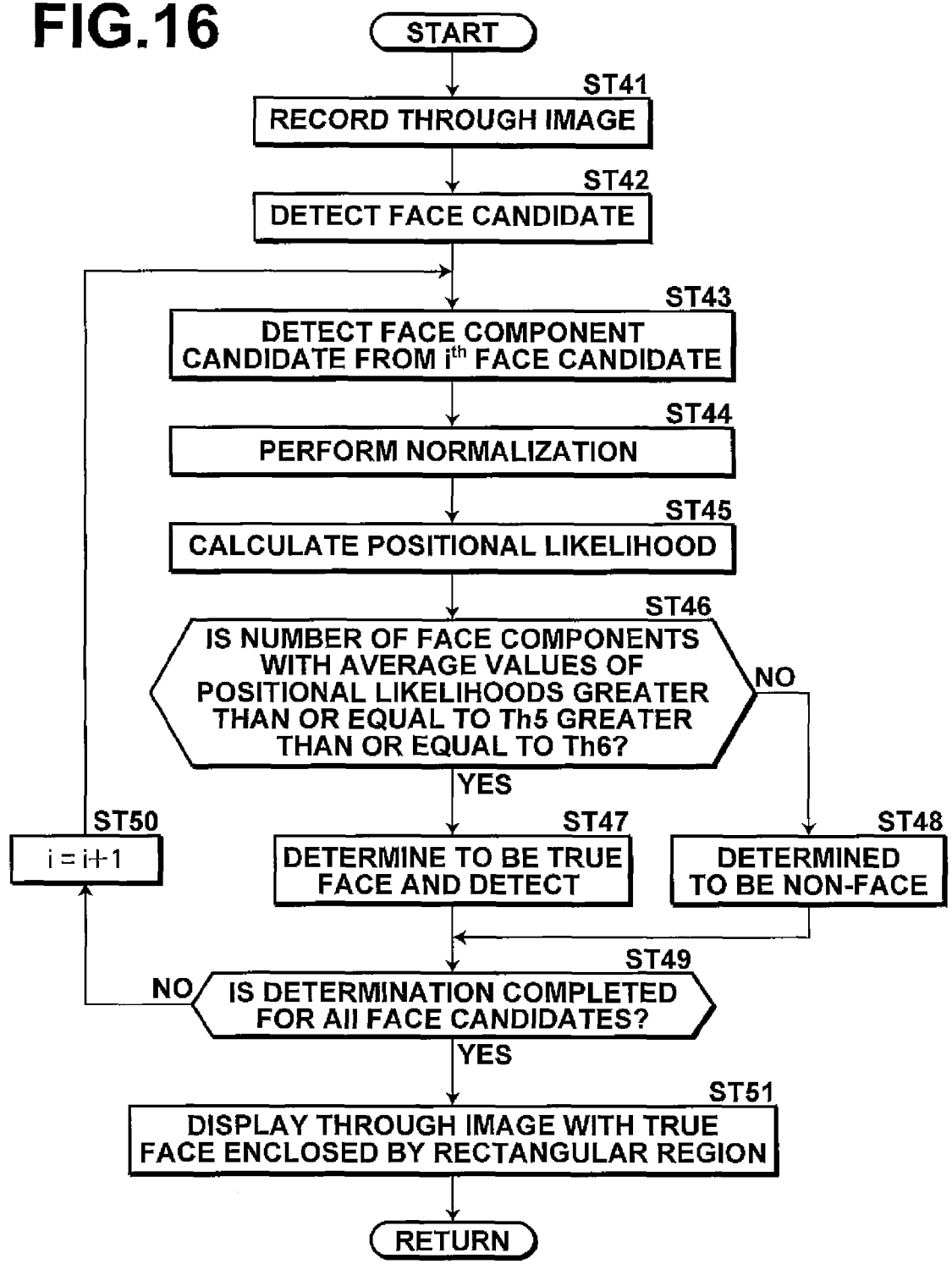
FIG. 16 is a flowchart illustrating a process performed in the fourth embodiment.

Next, a process performed in the fourth embodiment will be described. FIG. 16 is a flowchart illustrating the process performed in the fourth embodiment. Note that a process when the fourth embodiment is applied to the second embodiment will be described here, but it is also equally applied to the third embodiment.

When the operation mode of the digital camera 1 is set to photographing mode, the process is initiated by the CUP 40 and a through image is recorded (step ST41). Then, the face detection section 37 detects all of face candidates included in the through image (step ST42). Next, with $i^{th}$ face candidate as a processing target face candidate, the face component detection section 38 detects a face component candidate with respect to each of the face components from the processing target face (step ST43). Note that the initial value of "i" is 1.

Then, the determination section 39A normalizes a processing target face candidate (step ST44), calculates the positional likelihood of a face component candidate with respect to each face component after the normalization (step ST45), and determines whether or not the number of face components with average values of positional likelihoods greater than or equal to the threshold value Th5 is greater than or equal to the threshold value Th6 (step ST46). If the step ST46 is positive, the processing target face candidate is determined to be a true face and detected (step ST47). On the other hand, if the step ST46 is negative, the processing target face candidate is determined to be a non-face (step ST48).

Following the steps ST47 and ST48, the CPU 40 determines whether or not the determination by the determination section 39A is completed for all of the face candidates (step ST49). If the step ST49 is negative, the value of "i" is incremented by 1 (step ST50), and the process returns to the step ST43. If the step ST49 is positive, the through image with the true face enclosed by the rectangular region is displayed on the monitor 28 (step ST51), and the process returns to step ST41.

In this way, in the fourth embodiment, a face candidate is normalized through an affine transformation such that each of the face component candidates locates in the position of the corresponding face component within the region of the face candidate, so that a true face may be detected more accurately from face candidates.

In the fourth embodiment, the affine transformation coefficients are calculated for each of the face candidates to perform the affine transformation thereon. But, an alternative method may be employed in which, with respect to each face component, the average position of face component candidates selected from the respective face candidates is calculated, and the affine transformation coefficients are calculated such that the calculated average position corresponds to the center of the probability distribution. Also in this case, the affine transformation coefficients may be calculated from three candidates of the face component candidates selected from the nine face components, or they may be calculated from four or more face component candidates.

Further, in the fourth embodiment, the normalization may be performed on a face candidate by calculating provisional positional likelihoods or provisional positional relationship likelihoods for face component candidates with respect to each face component prior to the normalization, and performing an affine transformation on the face candidate such that a predetermined top number of face component candidates having the highest provisional positional likelihoods or positional relationship likelihoods corresponds to the positions of the corresponding face components (i.e., positions where the existence probabilities become maximum).

Next, a fifth embodiment of the present invention will be described. The fifth embodiment differs from the first embodiment only in the process performed by the determination section 39, so that the configuration thereof will not be elaborated upon further here.

The fifth embodiment differs from the first embodiment in that the determination section (which is different from that of the first embodiment and referred to as the determination section 39C) performs a first determination process for detecting a true face in which a determination is made as to whether a face candidate is a true face, a non-face, or an ambiguous face based on the number of face component candidates detected by the face component detection section 38 with respect each face component, and performs a second determination process for detecting a true face in which a determination is made as to whether or not the face candidate determined to be an ambiguous face by the first determination process is a true face based on the positions of the face component candidates as in the second, third, or fourth embodiment.

The determination section 39C in the fifth embodiment calculates each of the sums N1 to N9 of face component candidates with respect to each of nine face components K1 to K9 in the first determination process, and further calculates Nsum which is the add-up total of the sums N1 to N9, like the determination section 39 in the first embodiment. Then, if the add-up total Nsum is greater than or equal to a threshold value Th9, the processing target face candidate is determined to be a true face, and the face candidate is detected as a true face. If the add-up total Nsum is greater than or equal to a threshold value Th10 but smaller than the threshold value Th9, the processing target face candidate is determined to be an ambiguous face, if the add-up total Nsum is smaller than the threshold value Th10, the processing target face candidate is determined to be a non-face. Further, the process of either one of the second, third, and fourth embodiments is performed on the face candidate determined to be an ambiguous face as the second determination process.

Figure 17:
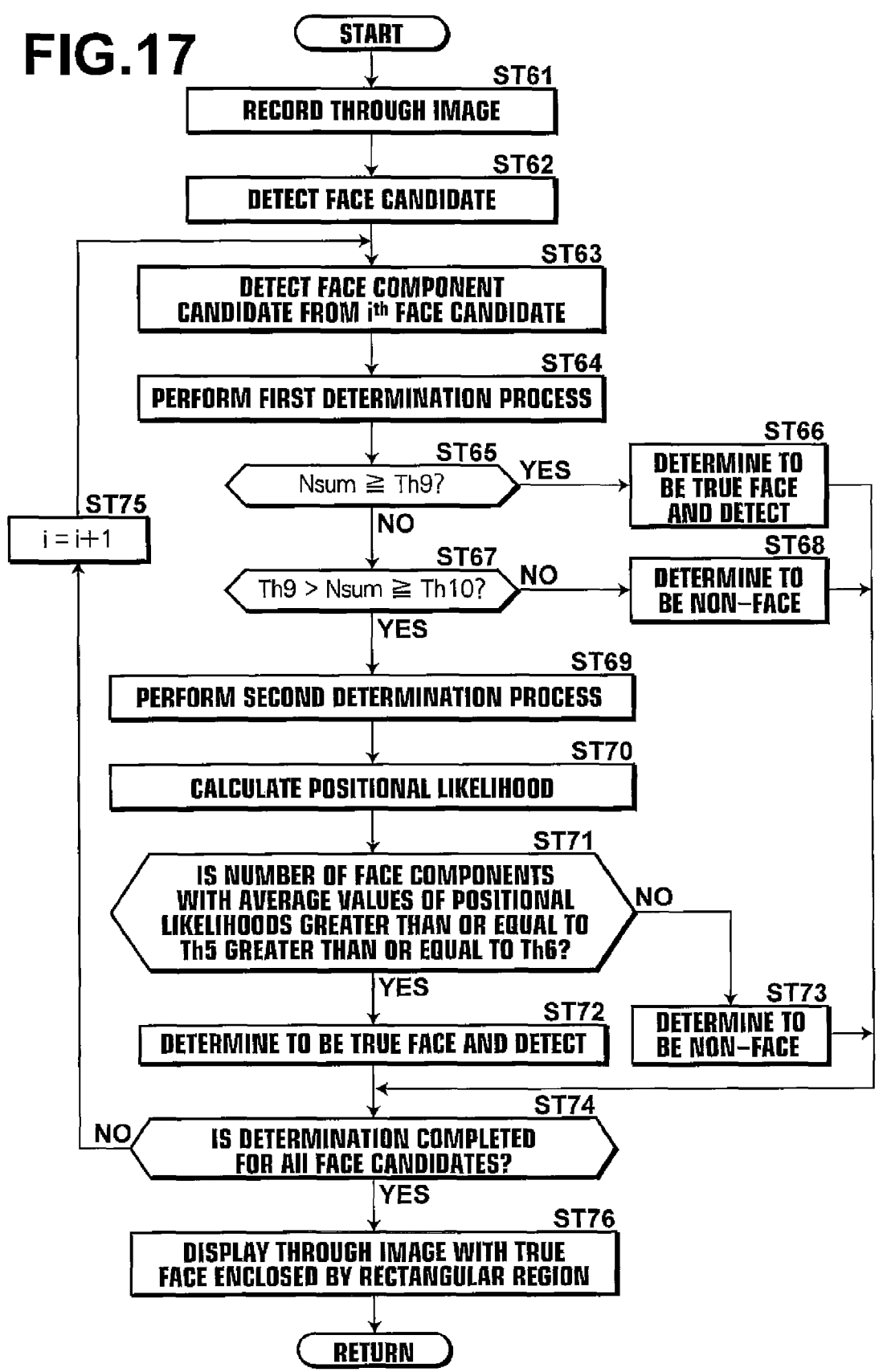
FIG. 17 is a flowchart illustrating a process performed in the fifth embodiment.

Next, a process performed in the fifth embodiment will be described. FIG. 17 is a flowchart illustrating the process performed in the fifth embodiment. When the operation mode of the digital camera 1 is set to photographing mode, the process is initiated by the CUP 40 and a through image is recorded (step ST61) Then, the face detection section 37 detects all of face candidates included in the through image (step ST62). Next, with $i^{th}$ face candidate as a processing target face candidate, the face component detection section 38 detects a face component candidate with respect to each of the face components from the processing target face (step ST63). Note that the initial value of "i" is 1.

Then, the determination section 39C performs the first determination process (step ST64). First, a determination is made as to whether or not the add-up total Nsum of the sum of face component candidates with respect to each of the face components detected by the face component detection section 38 is greater than or equal to the threshold value Th9 (step ST65). If the step ST65 is positive, the processing target face candidate is determined to be a true face and detected (step ST66). On the other hand, if the step ST65 is negative, a determination is made as to whether or not the add-up total Nsum is greater than or equal to the threshold value 10 but smaller than the threshold value Th9 (step ST67). If the step ST67 is negative, the processing target face candidate is determined to be a non-face (step ST68). If the step ST67 is positive, the processing target face candidate is determined to be an ambiguous face and the second determination process is performed (step ST69).

First, as in the second embodiment, the determination section 39C calculates the positional likelihood of the face component candidate with respect to each of the face components (step ST70), and determines whether or not the number of face components with the average values of the positional likelihoods greater than or equal to the threshold value Th5 is greater than or equal to the threshold value Th6 (step ST71). Note that the processing target face candidate may be normalized, as in the fourth embodiment, before the step ST70. Further, the processing in the steps ST70 and ST71 may be performed using the positional relationship likelihood, as in the processing in the steps ST34 and ST35 in the third embodiment. If the step ST71 is positive, the processing target face candidate is determined to be a true face and detected (step ST72). On the other hand, if the step ST71 is negative, the processing target face candidate is determined to be a non-face (step ST73).

Following the steps ST66, ST68, ST72, and ST 73, the CPU 40 determines whether or not the determination by the determination section 39C is completed for all of the face candidates (step ST74). If the step ST74 is negative, the value of "i" is incremented by 1 (step ST75), and the process returns to the step ST63. If the step ST74 is positive, the through image with the true face enclosed by the rectangular region is displayed on the monitor 28 (step ST20), and the process returns to step ST61.

Here, if a comparison is made between the case in which a determination is made as to whether or not a face candidate is a true face based on the number of face component candidates and the case in which a determination is made as to whether or not a face candidate is a true face based on the positions of face component candidates, the former requires a less amount of calculation. When photographing is performed for a dark scene or in backlight, a face candidate is imaged dark, so that the number of detected face component candidates is lessened even if the face candidate is a true face. As a result, a true face may possibly be determined to be a non-face where only the process of the first embodiment is performed. Accordingly, as in the fifth embodiment, making a determination only on a face candidate determined to be an ambiguous face based on the number of face component candidates as to whether or not the face candidate is a true face based on the positions of the face component candidates may reduce the amount of calculation, and accurately detect a true face from face candidates.

In the fifth embodiment, as the first determination process, a determination may be made as to whether a face candidate is a true face, ambiguous face, or non-face by plotting each of the sums N1 to N9 of face component candidates with respect to each of the nine face components K1 to K9 on a nine-dimensional space, setting a hyperplane or hypersurface that determines a threshold value in the nine-dimensional space, and making the determination according to on which side, the hyperplane or hypersurface, the plotted sums N1 to N9 locate.

Further, in the fifth embodiment, the first and second determination processes are performed in the same determination section, i.e., in the determination section 39C, but two separate determination sections may be provided for performing the first and second processes respectively.

Next, a sixth embodiment of the present invention will be described. The sixth embodiment differs from the first embodiment only in the processes performed by the face detection section 37 and determination section 39, so that the configuration thereof will not be elaborated upon further here.

In the sixth embodiment, the CPU 40 selects one of the following two processes to be performed according to an instruction from the user through the operation system 2: a process in which the image at a position of the detection frame where the matching level is greater than or equal to the threshold value Th0 is detected by the face detection section (which is different from that of the first embodiment and referred to as the face detection section 37A) as a true face (process based only on face detection section) and a process in which the image at a position of the detection frame where the matching level is greater than or equal to the threshold value Th0 is detected as a face candidate and the process of either one of the first to fifth embodiments (process based on face components) is performed on the detected face candidate.

Next, a process performed in the sixth embodiment will be described. FIG. 18 is a flowchart illustrating the process performed in the sixth embodiment. When the operation mode of the digital camera 1 is set to photographing mode, the process is initiated by the CUP 40 and a through image is recorded (step ST81). Then, the CPU 40 determines whether or not the performance of the process based on face components is being set (step ST82). If the step ST82 is negative, the process based only on face detection section is performed (step ST83) On the other hand, if the step ST82 is positive, the process based on face components is performed (step ST 84). In the process based on face components, the process of either one of the first to fifth embodiments is performed, so that it will not be elaborated upon further here.

Then, the CPU 40 causes the through image with the true face enclosed by the rectangular region to be displayed on the monitor 28 (step ST85), and the process returns to step ST81.

Here, the process based on face components requires a long time due to a large amount of calculation but provides high face detection accuracy, while the process based only on face detection section requires a less amount of calculation but the face detection accuracy is not so high. Thus, as in the sixth embodiment, by allowing the selection between the process based on face components and the process based only on face detection section, the user may arbitrarily select on which the user gives priority, face detection accuracy or calculation speed.

In the sixth embodiment, the switching between the process based on face components and process based only on face detection section is performed by the user setting. But where through images are obtained, for example, 30 frames/second, an arrangement may be adopted in which the process based only on face detection section is performed on the first 25 frames, and the process based on face components is performed on the remaining 5 frames.

Next, a seventh embodiment of the present invention will be described. The seventh embodiment differs from the first embodiment only in the processes performed by the face detection section 37 and determination section 39, so that the configuration thereof will not be elaborated upon further here.

In the seventh embodiment, the face detection section (which is different from that of the first embodiment and referred to as the face detection section 37B) performs a process in which the image at a position of the detection frame where the matching level is greater than or equal to the threshold value Th0 is detected as a true face (process based only on face detection section), and when the process based only on face detection section is performed on the next through image, if a previously detected face is not detected any longer, the image at a position of the detection frame where the matching level is greater than or equal to the threshold value Th0 is detected as a face candidate, as in the first to fifth embodiments, and the process of either one of the first to fifth embodiments (process based on face components) is performed on the detected face candidate.

Next, a process performed in the seventh embodiment will be described. FIG. 19 is a flowchart illustrating the process performed in the seventh embodiment. When the operation mode of the digital camera 1 is set to photographing mode, the process is initiated by the CUP 40 and a through image is recorded (step ST91). Then, the CPU 40 causes the process based only on face detection section to be performed (step ST92), and further determines whether or not a true face detected in the acquisition of the previous through image is detected again (step ST93). Note that the determination process in the step ST93 is skipped in the initial run.

If the step ST93 is negative, the process based on face components is performed (step ST94). In the process based on face components, the process of either one of the first to fifth embodiments is performed, so that it will not be elaborated upon further here.

If the step ST93 is positive or following the step ST94, the CPU 40 causes the through image with the true face enclosed by the rectangular region to be displayed on the monitor 28 (step ST95), and the process returns to step ST91.

Here, the process based on face components requires a long time due to a large amount of calculation but provides high face detection accuracy, while the process based only on face detection section requires a less amount of calculation but the face detection accuracy is not so high. Thus, as in the seventh embodiment, by performing the process based on face components when a true face is not detected by the process based only on face detection, a true face detection failure by the process based only on face detection section may be prevented, and a true face may be detected accurately.

Figure 20:
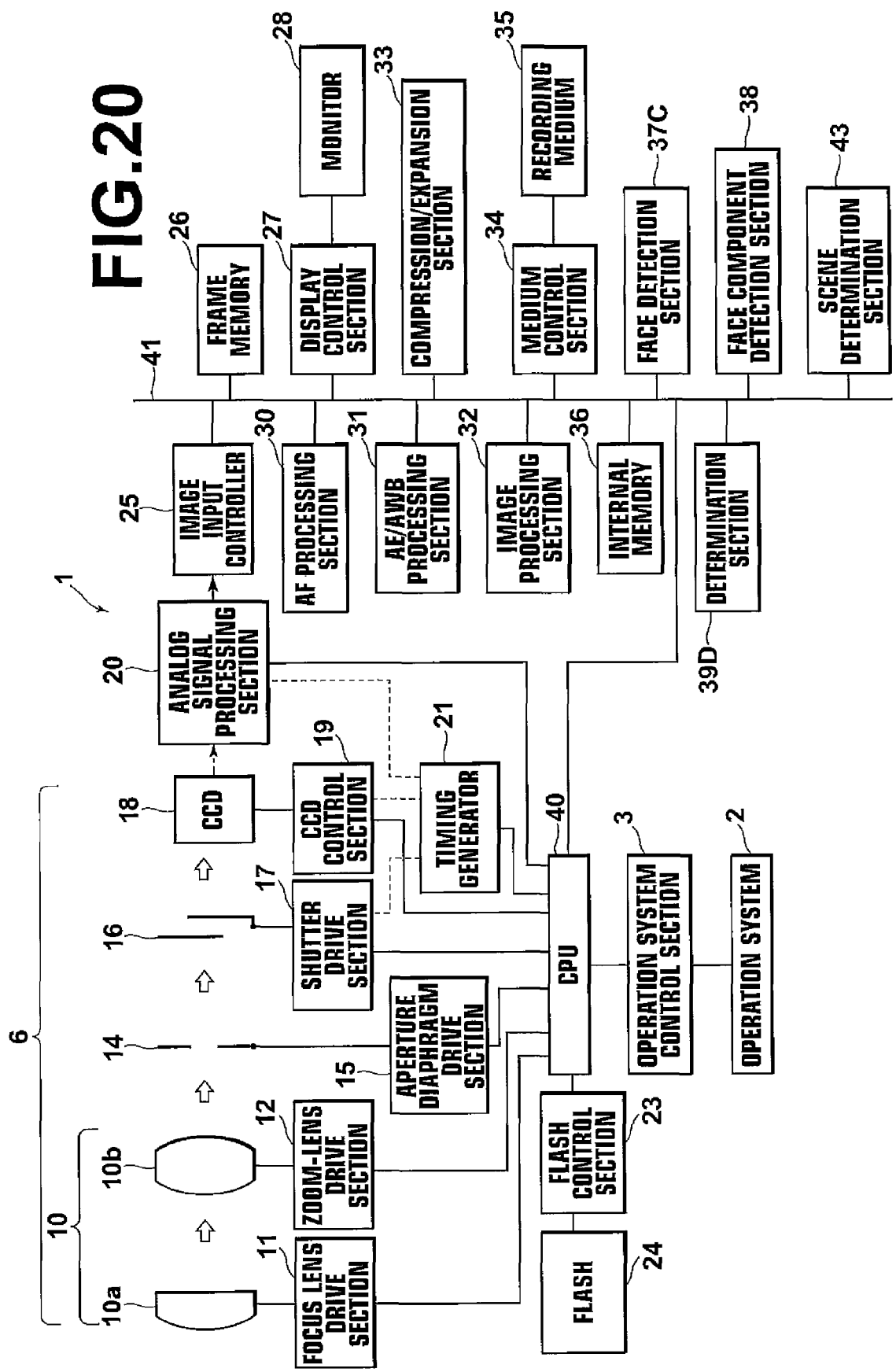
FIG. 20 is a schematic block diagram of a digital camera to which the photographing apparatus according to an eighth embodiment of the present invention is applied, illustrating the configuration thereof.

Next, an eighth embodiment of the present invention will be described. FIG. 20 is a schematic block diagram of a digital camera to which the photographing apparatus according to an eighth embodiment of the present invention is applied, illustrating the configuration thereof. In the eighth embodiment, components identical to those of the first embodiment are given the same reference numbers and will not be elaborated upon further here. The digital camera 1A according to the eighth embodiment differs from the first embodiment in that it includes a scene determination section 43 for determining the brightness of a photographing scene, and face detection is performed by a determination section 39D using a true face detection result of a face detection section 37C and a determination result of the scene determination section 43. In the eighth embodiment, the CPU 40 corresponds to a switching means.

The scene determination section 43 calculates the average pixel value of an entire through image as brightness, and determines the scene to be bright if the calculated brightness is greater than or equal to a threshold value Th11 or to be dark if the calculated brightness is smaller than the threshold value Th11.

In the eighth embodiment, a scene is determined by the scene determination section 43, and if the scene is determined to be bright, a process in which the image at a position of the detection frame where the matching level is greater than or equal to the threshold value Th0 is detected by the face detection section 37C as a true face (process based only on face detection section), while the scene is determined to be dark, a process in which the image at a position of the detection frame where the matching level is greater than or equal to the threshold value Th0 is detected as a face candidate as in the first to fifth embodiments and the process of either one of the first to fifth embodiments (process based on face components) is performed on the face candidate detected by the determination section 39D. Further, the process based only on face detection section is performed, and if the scene of the next through image is determined to be dark by the scene determination section 43, the process based on face components is performed.

Next, a process performed in the eighth embodiment will be described. FIG. 21 is a flowchart illustrating the process performed in the eighth embodiment. When the operation mode of the digital camera 1A is set to photographing mode, the process is initiated by the CUP 40 and a through image is recorded (step ST101). Then, the scene determination section 43 determines whether or not the scene is bright (step ST102). If the step ST102 is positive, the process based only on face detection section is performed (step ST103). On the other hand, if the step ST102 is negative, the process based on face components is performed (step ST104). In the process based on face components, the process of either one of the first to fifth embodiments is performed, so that it will not be elaborated upon further here.

Then, the CPU 40 causes the through image with the true face enclosed by the rectangular region to be displayed on the monitor 28 (step ST105), and the process returns to step ST101.

Here, the process based on face components requires a long time due to a large amount of calculation but provides high face detection accuracy, while the process based only on face detection section requires a less amount of calculation but the face detection accuracy is not so high. Thus, as in the eighth embodiment, by performing the process based on face components only when the scene is dark, a true face detection failure by the process based only on face detection section may be prevented, and a true face may be detected accurately.

In the eighth embodiment, the brightness of a scene is determined by the scene determination section 43. Further, a backlight scene may be detected by making a comparison between a central portion and a peripheral portion of a through image, and determining the scene as a backlight scene if the brightness of the central portion is darker than that of the peripheral portion by an amount greater than or equal to a predetermined value. In this case, if the scene is determined to be a backlight scene, the process based on face components may be performed, and if the scene is determined not to be a backlight scene, the process based only on face detection section may be performed.

So far, the digital cameras according to the embodiments of the present invention have been described. Programs for causing a computer to function as the means corresponding to the face detection sections 37, 37A to 37C, face component detection section 38, determination section 39, 39A to 39D, and scene determination section 43, thereby causing the computer to perform the processes like those illustrated in FIGS. 6, 12, 14 to 19, and 21 are further embodiments of the present invention. In addition, computer readable recording media on which such programs are recorded are still further embodiments of the present invention.

What is claimed is:
1. A photographing apparatus comprising:
a photographing means for obtaining an image by photographing;
a face detection means for detecting a face candidate included in the image;
a face component detection means for detecting a candidate of at least one of face components included in the face candidate with respect to each of the face components; and
a determination means for determining whether or not the face candidate is a true face based on the number of face component candidates detected with respect to each of the face components,
wherein the face detection means is a means for moving a detection frame, having a predetermined size, for detecting a face on the image to calculate a characteristic amount from the image within the detection frame at each moved position thereof, calculating a matching level between the calculated characteristic amount and a predetermined face characteristic amount, and when the matching level is greater than or equal to a predetermined threshold value, selecting whether to detect the image at the position of the detection frame as a face candidate or as a true face based on a predetermined condition,
wherein in a case where the photographing means is a means for obtaining images continuously, the face detection means is a means for detecting, with respect to the images obtained continuously, the image at the position of the detection frame as a true face, and when the scene brightness of the image does not satisfy a predetermined condition any longer, detecting the image at the position of the detection frame as a face candidate.
2. The photographing apparatus of claim 1, wherein when the true face is not detected any longer, detecting the image at the position of the detection frame as a face candidate.
3. A photographing apparatus comprising:
a photographing means for obtaining an image by photographing;
a face detection means for detecting a face candidate included in the image;
a face component detection means for detecting a candidate of a plurality of face components included in the face candidate with respect to each of the face components; and
a determination means for determining whether or not the face candidate is a true face based on the position of the face component candidate detected with respect to each of the face components,
wherein the face detection means is a means for moving a detection frame, having a predetermined size, for detecting a face on the image to calculate a characteristic amount from the image within the detection frame at each moved position thereof, calculating a matching level between the calculated characteristic amount and a predetermined face characteristic amount, and when the matching level is greater than or equal to a predetermined threshold value, selecting whether to detect the image at the position of the detection frame as a face candidate or as a true face based on a predetermined condition, wherein in a case where the photographing means is a means for obtaining images continuously, the face detection means is a means for detecting, with respect to the images obtained continuously, the image at the position of the detection frame as a true face, and when the scene brightness of the image does not satisfy a predetermined condition any longer, detecting the image at the position of the detection frame as a face candidate.

4. The photographing apparatus of claim 3, wherein the determination means is a means for calculating a positional likelihood of each of the face component candidates within the region of the face candidate with respect to the corresponding face component, and determining whether or not the face candidate is a true face based on the positional likelihood.

5. The photographing apparatus of claim 3, wherein the determination means is a means for calculating a positional relationship likelihood of each of the face component candidates within the region of the face candidate with respect to the face components other than the corresponding face component, and determining whether or not the face candidate is a true face based on the positional relationship likelihood.

6. The photographing apparatus of claim 3, wherein the determination mean is a means for normalizing the face candidate such that the position of each of the face component candidates corresponds to the position of the corresponding face component within the region of the face candidate, and determining whether or not the face candidate is a true face based on the position of each of the face component candidates within the normalized face candidate.

7. The photographing apparatus of claim 3, wherein when the true face is not detected any longer, detecting the image at the position of the detection frame as a face candidate.

8. A photographing apparatus comprising:
a photographing means for obtaining an image by photographing;
a face detection means for detecting a face candidate included in the image;
a face component detection means for detecting a candidate of a plurality of face components included in the face candidate with respect to each of the face components; and
a determination means for determining whether the face candidate is a true face, a non-face, or an ambiguous face based on the number of face component candidates detected with respect to each of the face components, and determining whether or not the face candidate determined to be an ambiguous face is a true face based on the position of the face component candidate detected with respect to each of the face components for the face candidate determined to be an ambiguous face,
wherein the face detection means is a means for moving a detection frame, having a predetermined size, for detecting a face on the image to calculate a characteristic amount from the image within the detection frame at each moved position thereof, calculating a matching level between the calculated characteristic amount and a predetermined face characteristic amount, and when the matching level is greater than or equal to a predetermined threshold value, selecting whether to detect the image at the position of the detection frame as a face candidate or as a true face based on a predetermined condition,
wherein in a case where the photographing means is a means for obtaining images continuously, the face detection means is a means for detecting, with respect to the images obtained continuously, the image at the position of the detection frame as a true face, and when the scene brightness of the image does not satisfy a predetermined condition any longer, detecting the image at the position of the detection frame as a face candidate.

9. The photographing apparatus of claim 8, wherein when the true face is not detected any longer, detecting the image at the position of the detection frame as a face candidate.

10. A photographing method comprising the steps of:
obtaining an image by photographing;
detecting a face candidate included in the image;
detecting a candidate of at least one of face components included in the face candidate with respect to each of the face components; and
determining whether or not the face candidate is a true face based on the number of face component candidates detected with respect to each of the face components,
wherein the step of detecting a face candidate includes
moving a detection frame, having a predetermined size, for detecting a face on the image to calculate a characteristic amount from the image within the detection frame at each moved position thereof, calculating a matching level between the calculated characteristic amount and a predetermined face characteristic amount, and when the matching level is greater than or equal to a predetermined threshold value, selecting whether to detect the image at the position of the detection frame as a face candidate or as a true face based on a predetermined condition,
wherein in a case where images are obtained continuously, the step of detecting a face candidate includes
detecting, with respect to the images obtained continuously, the image at the position of the detection frame as a true face, and when the scene brightness of the image does not satisfy a predetermined condition any longer, detecting the image at the position of the detection frame as a face candidate.

11. A photographing method comprising the steps of:
obtaining an image by photographing;
detecting a face candidate included in the image;
detecting a candidate of a plurality of face components included in the face candidate with respect to each of the face components; and
determining whether or not the face candidate is a true face based on the position of the face component candidate detected with respect to each of the face components,
wherein the step of detecting a face candidate includes
moving a detection frame, having a predetermined size, for detecting a face on the image to calculate a characteristic amount from the image within the detection frame at each moved position thereof, calculating a matching level between the calculated characteristic amount and a predetermined face characteristic amount, and when the matching level is greater than or equal to a predetermined threshold value, selecting whether to detect the image at the position of the detection frame as a face candidate or as a true face based on a predetermined condition,
wherein in a case where images are obtained continuously, the step of detecting a face candidate includes
detecting, with respect to the images obtained continuously, the image at the position of the detection frame as a true face, and when the scene brightness of the image does not satisfy a predetermined condition any longer, detecting the image at the position of the detection frame as a face candidate.

12. A photographing method comprising the steps of:
obtaining an image by photographing;
detecting a face candidate included in the image;

detecting a candidate of a plurality of face components included in the face candidate with respect to each of the face components;

determining whether the face candidate is a true face, a non-face, or an ambiguous face based on the number of face component candidates detected with respect to each of the face components; and determining whether or not the face candidate determined to be an ambiguous face is a true face based on the position of the face component candidate detected with respect to each of the face components for the face candidate determined to be an ambiguous face, wherein the step of detecting a face candidate includes moving a detection frame, having a predetermined size, detecting a face on the image to calculate a characteristic amount from the image within the detection frame at each moved position thereof, and calculating a matching level between the calculated characteristic amount and a predetermined face characteristic amount, and when the matching level is greater than or equal to a predetermined threshold value, selecting whether to detect the image at the position of the detection frame as a face candidate or as a true face based on a predetermined condition, wherein in a case where the images are obtained continuously, the step of detecting a face candidate includes detecting, with respect to the images obtained continuously, the image at the position of the detection frame as a true face, and when the scene brightness of the image does not satisfy a predetermined condition any longer, detecting the image at the position of the detection frame as a face candidate.

13. A computer readable non-transitory recording medium on which a program for causing a computer to perform a photographing method is recorded, the method comprising the steps of:

obtaining an image by photographing;
detecting a face candidate included in the image;
detecting a candidate of at least one of face components included in the face candidate with respect to each of the face components; and determining whether or not the face candidate is a true face based on the number of face component candidates detected with respect to each of the face components, wherein the step of detecting a face candidate includes moving a detection frame, having a predetermined size, for detecting a face on the image to calculate a characteristic amount from the image within the detection frame at each moved position thereof, calculating a matching level between the calculated characteristic amount and a predetermined face characteristic amount, and when the matching level is greater than or equal to a predetermined threshold value, selecting whether to detect the image at the position of the detection frame as a face candidate or as a true face based on a predetermined condition, wherein in a case where images are obtained continuously, the step of detecting a face candidate includes detecting, with respect to the images obtained continuously, the image at the position of the detection frame as a true face, and when the scene brightness of the image does not satisfy a predetermined condition any longer, detecting the image at the position of the detection frame as a face candidate.

14. A computer readable non-transitory recording medium on which a program for causing a computer to perform a photographing method is recorded, the method comprising the steps of:

obtaining an image by photographing;
detecting a face candidate included in the image;
detecting a candidate of a plurality of face components included in the face candidate with respect to each of the face components; and determining whether or not the face candidate is a true face based on the position of the face component candidate detected with respect to each of the face components, wherein the step of detecting a face candidate includes moving a detection frame, having a predetermined size, for detecting a face on the image to calculate a characteristic amount from the image within the detection frame at each moved position thereof, calculating a matching level between the calculated characteristic amount and a predetermined face characteristic amount, and when the matching level is greater than or equal to a predetermined threshold value, selecting whether to detect the image at the position of the detection frame as a face candidate or as a true face based on a predetermined condition, wherein in a case where images are obtained continuously, the step of detecting a face candidate includes detecting, with respect to the images obtained continuously, the image at the position of the detection frame as a true face, and when the scene brightness of the image does not satisfy a predetermined condition any longer, detecting the image at the position of the detection frame as a face candidate.

15. A computer readable non-transitory recording medium on which a program for causing a computer to perform a photographing method is recorded, the method comprising the steps of:

obtaining an image by photographing;
detecting a face candidate included in the image;
detecting a candidate of a plurality of face components included in the face candidate with respect to each of the face components;

determining whether the face candidate is a true face, a non-face, or an ambiguous face based on the number of face component candidates detected with respect to each of the face components; and determining whether or not the face candidate determined to be an ambiguous face is a true face based on the position of the face component candidate detected with respect to each of the face components for the face candidate determined to be an ambiguous face, wherein the step of detecting a face candidate includes moving a detection frame, having a predetermined size, detecting a face on the image to calculate a characteristic amount from the image within the detection frame at each moved position thereof, and calculating a matching level between the calculated characteristic amount and a predetermined face characteristic amount, and when the matching level is greater than or equal to a predetermined threshold value, selecting whether to detect the image at the position of the detection frame as a face candidate or as a true face based on a predetermined condition, wherein in a case where the images are obtained continuously, the step of detecting a face candidate includes detecting, with respect to the images obtained continuously, the image at the position of the detection frame as a true face, and when the scene brightness of the image does not satisfy a predetermined condition any longer, detecting the image at the position of the detection frame as a face candidate.

* * * * *